(12) United States Patent
Larson et al.

(10) Patent No.: US 12,400,273 B2
(45) Date of Patent: Aug. 26, 2025

(54) METHODS AND SYSTEMS FOR SUBMITTING AND/OR PROCESSING INSURANCE CLAIMS FOR DAMAGED MOTOR VEHICLE GLASS

(71) Applicant: Neural Claim System, Inc., Chandler, AZ (US)

(72) Inventors: Jim Larson, Chandler, AZ (US); Edward Zabasajja, Chandler, AZ (US); Craig J. Mullen, Phoenix, AZ (US); Douglas J. Nelson, Chandler, AZ (US); Deron Simmons, Chandler, AZ (US)

(73) Assignee: Neural Claim System, Inc., Chandler, AZ (US)

( * ) Notice: Subject to any disclaimer, the term of this patent is extended or adjusted under 35 U.S.C. 154(b) by 203 days.

(21) Appl. No.: 18/122,085

(22) Filed: Mar. 15, 2023

(65) Prior Publication Data

US 2023/0214936 A1     Jul. 6, 2023

Related U.S. Application Data

(63) Continuation-in-part of application No. 17/198,114, filed on Mar. 10, 2021, which is a
(Continued)

(51) Int. Cl.
*G06Q 40/08* (2012.01)
*G06V 10/764* (2022.01)
(Continued)

(52) U.S. Cl.
CPC ............ *G06Q 40/08* (2013.01); *G06V 10/764* (2022.01); *G06V 10/945* (2022.01); *G06V 20/50* (2022.01)

(58) Field of Classification Search
CPC ........ G06Q 40/08; G06Q 10/10; G06Q 10/20; G06Q 30/0185; G06V 10/764;
(Continued)

(56) References Cited

U.S. PATENT DOCUMENTS

| 8,364,505 B1 | 1/2013 | Kane et al. |
| 8,527,357 B1 * | 9/2013 | Ganesan ................. G06Q 30/06 705/26.1 |

(Continued)

FOREIGN PATENT DOCUMENTS

| CN | 105405054 A | 3/2016 |
| CN | 106203644 A | 7/2016 |

(Continued)

OTHER PUBLICATIONS

Shih-Lin, et al., "Technique on Vehicle Damage Assessment After Collisions Using Optical Radar Technology and Iterative Closest Point Algorithm", IEEE Access 12 : 174507-174518. The Institute of Electrical and Electronics Engineers, Inc. (IEEE).. (Year: 2024).*
(Continued)

*Primary Examiner* — Frantzy Poinvil
(74) *Attorney, Agent, or Firm* — Wells St. John P.S.

(57) ABSTRACT

A method and system for submitting an insurance claim for damaged motor vehicle glass are provided that can include: receiving a plurality of images associated with motor vehicle glass at processing circuitry; performing image processing operations on each of the plurality of images to determine one or more of glass damage, glass type, and/or claim fraud; and submitting an insurance claim for motor vehicle glass repair or replace based on the glass type or damage, or flagging the claim as fraud. There is also provided a non-transitory computer readable storing instruction that when executed by a processor, causes a computer system to perform the following method. The method can include:
(Continued)

prompting a user for initial claim submission information; prompting the user for a plurality of images of portions of motor vehicle glass, performing image processing operations on each of the plurality of images to train or improve the computer system, determine one or more of glass damage, glass type, and/or claim fraud; and one of submit or reject an insurance claim for glass repair.

5 Claims, 33 Drawing Sheets

Related U.S. Application Data continuation-in-part of application No. 17/016,097, filed on Sep. 9, 2020, now abandoned.

(60) Provisional application No. 62/897,746, filed on Sep. 9, 2019.

(51) Int. Cl.
*G06V 10/94* (2022.01)
*G06V 20/50* (2022.01)

(58) Field of Classification Search
CPC .... G06V 10/945; G06V 20/50; G06V 10/245; G06V 10/25; G06V 20/62; G06N 20/00; G06N 5/025
USPC ...................................... 705/3–44
See application file for complete search history.

(56) References Cited

U.S. PATENT DOCUMENTS

| | | | |
|---|---|---|---|
| 8,712,893 B1 | 4/2014 | Brandmaier et al. | |
| 9,600,733 B1 | 3/2017 | Wilbert et al. | |
| 9,824,453 B1 | 11/2017 | Collins et al. | |
| 9,886,771 B1 | 2/2018 | Chen et al. | |
| 9,990,662 B2 | 6/2018 | Couch et al. | |
| 10,319,094 B1 | 6/2019 | Chen et al. | |
| 10,360,601 B1 | 7/2019 | Adegan | |
| 10,373,260 B1 | 8/2019 | Haller, Jr. et al. | |
| 10,706,321 B1* | 7/2020 | Chen | G06T 3/4007 |
| 10,733,160 B1 | 8/2020 | Leise et al. | |
| 10,803,527 B1* | 10/2020 | Zankat | G06V 30/40 |
| 10,909,673 B2 | 2/2021 | Forutanpour et al. | |
| 11,288,789 B1* | 3/2022 | Chen | G06T 7/001 |
| 11,361,387 B1* | 6/2022 | Call | G06Q 50/16 |
| 2002/0188479 A1 | 12/2002 | Renwick et al. | |
| 2008/0172258 A1 | 7/2008 | Weger et al. | |
| 2012/0297337 A1 | 11/2012 | St. Denis et al. | |
| 2015/0317612 A1 | 11/2015 | Couch | |
| 2015/0332411 A1 | 11/2015 | Bush et al. | |
| 2017/0147991 A1 | 5/2017 | Franke et al. | |
| 2017/0221110 A1 | 8/2017 | Sullivan et al. | |
| 2017/0293894 A1 | 10/2017 | Taliwal et al. | |
| 2017/0315007 A1* | 11/2017 | Fitzgerald | G06F 3/0418 |
| 2017/0352104 A1 | 12/2017 | Hanson et al. | |
| 2017/0372465 A1 | 12/2017 | Forutanpour et al. | |
| 2018/0040039 A1 | 2/2018 | Wells et al. | |
| 2018/0182039 A1 | 6/2018 | Wang et al. | |
| 2018/0240194 A1 | 8/2018 | Dong et al. | |
| 2018/0260793 A1 | 9/2018 | Li et al. | |
| 2018/0293806 A1 | 10/2018 | Zhang et al. | |
| 2019/0114717 A1* | 4/2019 | Labrie | G06Q 40/08 |
| 2020/0090321 A1 | 3/2020 | Xu | |
| 2021/0081698 A1 | 3/2021 | Lindeman et al. | |
| 2021/0142464 A1 | 5/2021 | Tian et al. | |
| 2022/0122243 A1* | 4/2022 | Fitzgerald | G06V 10/25 |

FOREIGN PATENT DOCUMENTS

| | | |
|---|---|---|
| WO | WO 2018/039560 | 3/2018 |
| WO | WO 2018/055340 | 3/2018 |

OTHER PUBLICATIONS

EP EP 20862118 Extend. Search Rpt, Aug. 29, 2023, Neural Claim System Inc.
WO PCT/US2022/019649 IPRP, Sep. 21, 2023, Neural Claim System Inc.
WO PCT/US2024/020097 Search Rept., Jun. 26, 2024, Neural Claim System, Inc.
WO PCT/US2024/020097 Writ. Opin., Jun. 26, 2024, Neural Claim System, Inc.
WO PCT/US20/049978 Search Report, Nov. 27, 2020, Neural Claim System, Inc.
WO PCT/US20/049978 Written Opin, Nov. 27, 2000, Neural Claim System, Inc.
WO PCT/US2020/049978 IPRP, Mar. 9, 2022, Neural Claim System, Inc.
WO PCT/US2022/019649 Search Rept., May 23, 2022, Neural Claim System, Inc.
WO PCT/US2022/019649 Writ. Opin., May 23, 2022, Neural Claim System, Inc.
D'Angelo, "Classify vehicle damage images", IBM Developer, Feb. 2018, 5 pages, United States.
Haller, "AI in Claims—It's Happening Now", https://www.cccis.com/category/insurance) Feb. 2018, 4 pages, United States.
https://www.glassbytes.com/2018/02/autoglass-launches-artificial-intelligence-technology, Feb. 2018, 1 page, United States.
Huetter, "Mitchell gives details on photography, data set, decision-making under new AI crash image analysis", Repairer Driven News, Oct. 2016, 7 pages, United States.
Turol, "Automotive Insurance with TensorFlow: Estimating Damage/Repair Costs", www.altoros.com/blog/author/sophie-turol, Feb. 2018, 6 pages, United States.
EP EP 2276946 Ext. Search Rpt., Jan. 2, 2025, Neural Claim System, Inc.
O'Toole "5 ways to know your auto glass claim isn't fraudulent", Property & Casualty 360 ALM Media Properties, LLC, Proquest Document ID 1829028324, Oct. 14, 2016, 3 pages, United States.
Rosenfield, "A Clear View on the Future of Auto Glass", ALM Media Properties, LLC, Proquest Document ID 1786091824, May 2016, 3 pages, United States.

* cited by examiner

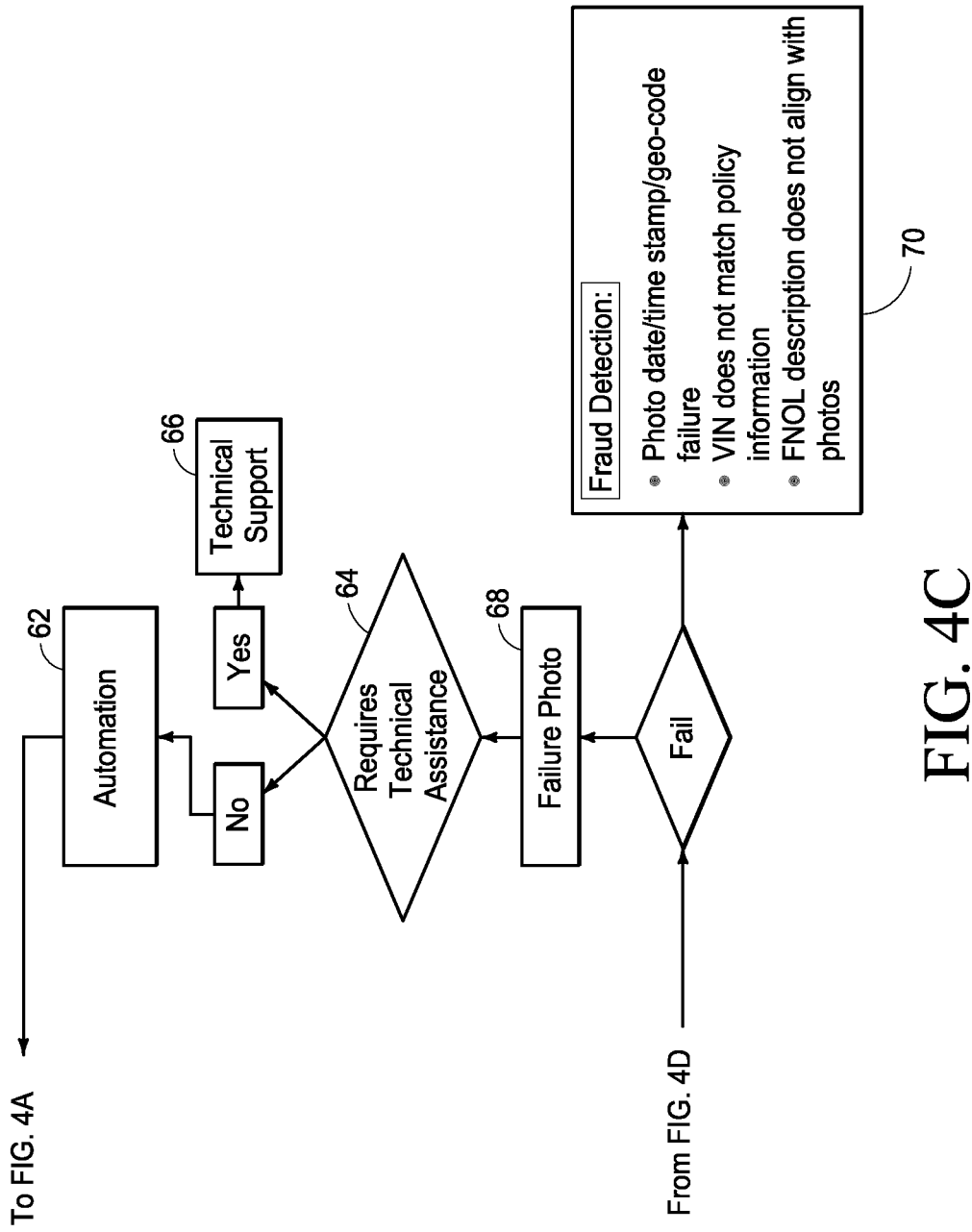

FIG. 4E ically distributed data between the record of origin for auto glass in North America (National Auto Glass Specifications "NAGS"— Mitchell) and one of the largest Manufacturer Build Data providers of vehicle data in North America is incompatible.

METHODS AND SYSTEMS FOR SUBMITTING AND/OR PROCESSING INSURANCE CLAIMS FOR DAMAGED MOTOR VEHICLE GLASS

CROSS REFERENCE TO RELATED APPLICATION

This application is a continuation-in-part of U.S. patent application Ser. No. 17/198,114 filed Mar. 10, 2021, entitled "Methods and Systems for Submitting and/or Processing Insurance Claims for Damaged Motor Vehicle Glass", which is a continuation-in-part of U.S. patent application Ser. No. 17/016,097 filed Sep. 9, 2020, entitled "Methods and Systems for Submitting and/or Processing Insurance Claims for Damaged Motor Vehicle Glass", which claims priority to and the benefit of U.S. Provisional Patent Application Ser. No. 62/897,746 filed Sep. 9, 2019, entitled "Methods and Systems for Submitting and/or Processing Insurance Claims for Damaged Motor Vehicle Glass", the entirety of each of which is incorporated by reference herein.

TECHNICAL FIELD

The present disclosure relates to systems and methods for submitting and processing insurance claims, and more particularly to systems and methods for submitting and processing insurance claims for damaged motor vehicle glass.

BACKGROUND

Most road vehicles in the North America contain glass windows and windshields, yet the ability to associate manufacturer vehicle data with vehicle auto glass is difficult. There does not exist a commonly available programmatic way to tie manufacturer vehicle specifics to reconcilable auto glass.

This challenge exists because the electronically distributed data between the record of origin for auto glass in North America (National Auto Glass Specifications "NAGS"— Mitchell) and one of the largest Manufacturer Build Data providers of vehicle data in North America is incompatible.

When motor vehicle glass such as windshields are damaged, they are typically covered by insurance, and because they are covered by insurance, this necessitates the submission of a claim for insurance coverage. Currently, this can be done by having an insurance adjuster come out and look at your motor vehicle, or taking your motor vehicle in to an adjuster. This can require considerable time and effort, and slow the process of eventually getting your glass fixed through repair or replacement. The present disclosure provides automated methods and systems for submitting and/or processing an insurance claim for damaged motor vehicle glass. The methods can provide for greater efficiency and processing.

SUMMARY

The present disclosure provides a repeatable and reproducible process to combine vehicle manufacturer data with auto glass data via an application programming interface (API). The API manipulates the outputs of the electronic datasets from Manufacture Build Data Provider(s) and the National Auto Glass Specifications (NAGS) into an agglutinated response.

Methods for submitting and/or processing insurance claims for damaged motor vehicle glass are provided that can include: receiving a plurality of images associated with motor vehicle glass at processing circuitry; performing image processing operations on each of the plurality of images to determine one or more of glass damage, glass type, and/or claim fraud; and submitting an insurance claim for glass repair or replacement based on the glass type or damage, or flagging the claim as fraud.

The present disclosure also provides a non-transitory computer readable storing instruction that when executed by a processor, causes a computer system to perform the following method. The method can include: prompting a user for initial claim submission information; prompting the user for a plurality of images of portions of motor vehicle glass; performing image processing operations on each of the plurality of images to train the computer system, determine one or more of glass damage, glass type, and/or claim fraud; and one of submit or reject an insurance claim for motor vehicle glass repair or replacement.

The present disclosure also provides a non-transitory computer-readable storage medium storing instruction that, when executed by a processor, causes a computer system to perform the following method: prompt a user for vehicle glass vendor information; process the information to determine if the user is in possession of the vehicle and/or whether the glass of the vehicle needs to be repaired or replaced; if the user is in possession of the vehicle and a replacement is determined, the user is: prompted for the VIN number of the vehicle; and the VIN number is processed through third party data to determine the required part numbers; if the user is not in possession of the vehicle, the user is: prompted for the VIN number of the vehicle; prompted for photos of the vehicle, vehicle glass, and damaged portions; the captured photos are proceed to determine repair or replace; if replace, the VIN number is processed through third party data to determine the required part numbers; and if repair, the method ends.

DRAWINGS

Embodiments of the disclosure are described below with reference to the following accompanying drawings.

FIG. 4C is a represented portion of an overall method as part of a system for automatically generating and/or processing insurance claims.

FIG. 4E is an example interface prompt for a use according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
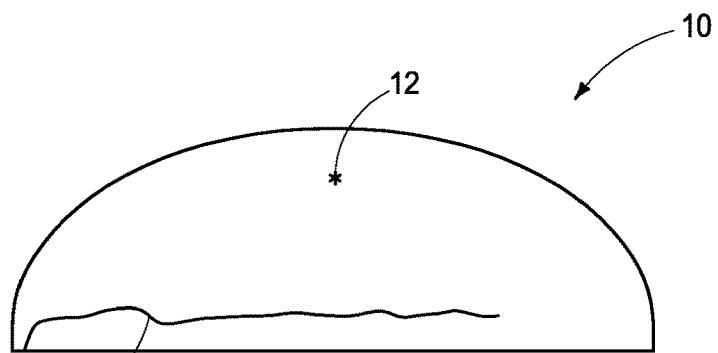
FIG. 1 is a representation of motor vehicle glass having a long crack and a chip therein.

The present disclosure will be described with reference to FIGS. 1-23. Referring first to FIG. 1, example motor vehicle glass 10 is shown that includes a chip 12 as well as a crack 14. Glass 10 can include multiple chips and/or multiple cracks. Glass 10 can be a windshield of a motor vehicle for example and it may or may not be constructed of Silicon. Glass 10 can also be a primarily polymeric construction such as a laminate. As can be seen, the crack extends a distance across the glass, and there is a single chip. The chip can be any one of a number of types of chips and occupy any place on the motor vehicle glass. Accordingly, the glass 10 of FIG. 1 is damaged; hence it is designated as prior art.

Figure 2:
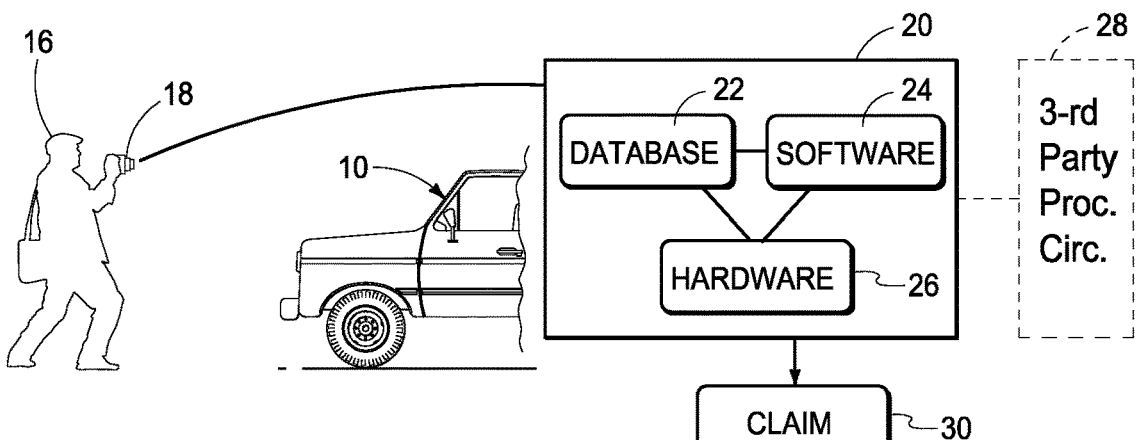
FIG. 2 is an example method according to an embodiment of the disclosure.

Referring next to FIG. 2, an overall system is shown that includes a user 16 operating an image capturing device or camera 18. This image capturing device or camera 18 can be any form of electronic image capturing device. It is not necessary that the image capturing device be a person digital assistant or cell phone, or even a tablet or other form of computer. It need not have a plethora of processing circuitry ability; the only requirement is that it is able to capture images. Accordingly, the device 18 can have at least some processing circuitry, at least a sufficient configuration to capture, store, and/or transfer one or more images. The image(s) captured utilizing camera 18 can be then transferred or uploaded to processing circuitry 20, which includes a database 22 operably coupled to software 24 and hardware 26. In accordance with example configurations, images can be captured and processed on the same or multiple devices connected via wire or wirelessly. The images may also be processed using cloud-based storage and/or processing software.

In accordance with example implementations, the images can be captured by following prompts or directions from an application on the computing device such as a tablet or smart phone having processing circuitry and a camera. These prompts or directions can specify the image to be captured and the order in which the images are captured, for example. As described in more detail in the following description, not only can the system prompt the capture of automobile glass, specific portions of automobile glass, but also specific portions of the automobile, such as, for example, specific section of the automobile glass, automobile identifiers, glass identifiers, license plates.

The processing circuitry can include personal computing system that includes a computer processing unit that can include one or more microprocessors, one or more support circuits, circuits that include power supplies, clocks, input/output interfaces, circuitry, and the like. Generally, all computer processing units described herein can be of the same general type. Application Platform Interface (API) that allows communication between different software applications in the system. The memory can include random access memory, read only memory, removable disc memory, flash memory, and various combinations of these types of memory. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as financial institutions, insurance providers, and/or software support providers. The system is not limited to a specific operating system but may be adapted to run on multiple operating systems such as, for example, Linux and/or Microsoft Windows. The computing system can be coupled to a server and this server can be located on the same site as the computer system or at a remote location, for example.

In accordance with example implementations, these processes may be utilized in connection with the processing circuitry described. The processes may use software and/or hardware of the following combinations or types. For example, with respect to server-side languages, the circuitry may use Java, Python, PHP, .NET, Ruby, JavaScript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLite (for Mobile). Client-side languages that may be used, this would be the user side languages, for example, are ASM, C, C++, C #, Java, Objective-C, Swift, ActionScript/Adobe AIR, or JavaScript/HTML5. Communications between the server and client may be utilized using TCP/UDP Socket based connections, for example, as Third-Party data network services that may be used include GSM, LTE, HSPA, UMTS, CDMA, WiMAX, WIFI, Cable, and DSL. The hardware platforms that may be utilized within processing circuitry include embedded systems such as (Raspberry PI/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

The systems and/or processing circuitry 20 of the present disclosure can include a server or cluster of servers, one or more devices 18, additional computing devices, several network connections linking devices 18 to server(s) including the network connections, one or more databases 22, and a network connection between the server and the additional computing devices, such as those devices that may be linked to an adjuster.

Device 18 and/or processing circuitry 20 and/or plurality of devices 18 and the additional computing device can be any type of communication devices that support network communication, including a telephone, a mobile phone, a smart phone, a personal computer, a laptop computer, a smart watch, a personal digital assistant (PDA), a wearable or embedded digital device(s), a network-connected vehicle, etc. In some embodiments, the devices 18 and the computing device can support multiple types of networks. For example, the devices 18 and the computing device may have wired or wireless network connectivity using IP (Internet Protocol) or may have mobile network connectivity allowing over cellular and data networks.

The various networks may take the form of multiple network topologies. For example, networks can include wireless and/or wired networks. Networks can link the server and the devices 18. Networks can include infrastructure that support the links necessary for data communication between at least one device 18 and a server. Networks may include a cell tower, base station, and switching network as well as cloud-based networks.

As described in greater detail herein, devices 18 can be used to capture one or more images of damaged glass. The images are transmitted over a network connection to a server. The server can process the images to assess damage, obtain information to assist with determination and/or condition of repair costs, process a claim, detect fraud, and/or train the system to better review future images. The features can be transmitted over network connection to another computer device for approval or adjustment.

In accordance with example implementations, device 18 can have the following functional components; one or more processors, memory, network interfaces, storage devices, power source, one or more output devices, one or more input devices, and software modules—operating the system and a motor vehicle glass claims application—stored in memory. The software modules can be provided as being contained in memory, but in certain embodiments, the software modules can be contained in storage devices or a combination of memory and storage devices. Each of the components including the processor, memory, network interfaces, storage devices, power source, output devices, input devices, operating system, the network monitor, and the data collector can be interconnected physically, communicatively, and/or operatively for inter-component communications.

The processor can be configured to implement functionality and/or process instructions for execution within device 18. For example, the processor can execute instructions stored in the memory or instructions stored on a storage device. Memory can be a non-transient, computer-readable storage medium, and configured to store information within device 18 during operation. In some embodiments, memory can include a temporary memory, an area for information not to be maintained when the device 18 is turned off. Examples of such temporary memory include volatile memories such as Random Access Memory (RAM), dynamic random access memories (DRAM), and Static Random Access Memory (SRAM). Memory can also maintain program instructions for execution by the processor.

Device 18 can also include one or more non-transient computer-readable storage media. The storage device can be generally configured to store larger amounts of information than memory. The storage device can further be configured for long-term storage of information. In some embodiments, the storage device can include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

Device 18 can use network interfaces to communicate with external devices or server(s) via one or more networks, and other types of networks through which a communication with the device 18 may be established. Network interfaces may be a network interface card, such as an Ethernet card, an optical transceiver, a radio frequency transceiver, or any other type of device that can send and receive information. Other non-limiting examples of network interfaces include Bluetooth, Cellular Connection Technology (e.g., 3G LTE) and Wi-Fi radios in client computing devices, and Universal Serial Bus (USB). In specific implementations, device 18 may not have access to an entirety of the system. For example, the system will have a database that includes a myriad of captured as well as generated images and certain implementations will not allow access to these images by the prompted operator.

Device 18 can include one or more power sources to provide power to the device. Non-limiting examples of power sources can include single-use power sources, rechargeable power sources, and/or power sources developed from nickel-cadmium, lithium-ion, or other suitable material.

One or more output devices can also be included in device 18. Output devices can be configured to provide output to a user using tactile, audio, and/or video stimuli. Output devices can include a display screen (part of the presence-sensitive screen), a sound card, a video graphics adapter card, or any other type of device for converting a signal into an appropriate form understandable to humans or machines. Additional examples of output devices can include a speaker such as headphones, a Cathode Ray Tube (CRT) monitor, a Liquid Crystal Display (LCD), or any other type of device that can generate intelligible output to a user.

Device 18 can include one or more input devices. Input devices can be configured to receive input from a user or a surrounding environment of the user through tactile, audio, and/or video feedback. Non-limiting examples of input devices can include a photo and video camera, presence-sensitive screen, a mouse, a keyboard, a voice responsive system, microphone or any other type of input device. In some examples, a presence-sensitive screen includes a touch-sensitive screen.

Device 18 can include an operating system. The operating system can control operations of the components of the device 18. For example, the operating system can facilitate the interaction of the processors, memory, network interface, storage device(s), input device, output device, and power source.

Device 18 can be configured to use a claims application to capture one or more images of damaged glass. In some embodiments, the claims application may guide a user of device 18 as to which views should be captured. In some embodiments, the claims application can interface with and receive inputs from a GPS transceiver and/or accelerometer.

The servers can be at least one computing machine that can assess and accurately identify vehicle glass repair, replacement or a no damage disposition, glass part number (i.e., glass part number, pricing, and/or availability), advance-driver assistance-system (ADAS) calibration requirements and supported moldings required based on images provided from device 18. The server can have access to one or more databases and other facilities that provide the features described herein.

Servers, according to certain aspects of the disclosure can include one or more processors, memory, network interface(s), storage device(s), and software modules—image processing engines, damage estimation engines, and database query and edit engines can be stored in the memory. The software modules are provided as being stored in memory, but in certain embodiments, the software modules are stored in storage devices or a combination of memory and storage devices. In certain embodiments, each of the components including the processor(s), memory, network interface(s), storage device(s), media manager, connection service router, data organizer, and database editor are interconnected physically, communicatively, and/or operatively for inter-component communications.

Processor(s), analogous to processor(s) in device 18, can be configured to implement functionality and/or process instructions for execution within the server. For example, processor(s) can execute instructions stored in memory or instructions stored on storage devices. Memory, which may be a non-transient, computer-readable storage medium, is configured to store information within the server during operation. In some embodiments, memory includes a temporary memory, i.e., an area for information not to be maintained when the server is turned off. Examples of such temporary memory include volatile memories such as Random Access Memory (RAM), dynamic random access memories (DRAM), and Static Random Access Memories (SRAM). Memory also maintains program instructions for execution by processor(s).

The server uses network interface(s) to communicate with external devices via one or more networks. Such networks may also include one or more wireless networks, wired networks, fiber optics networks, and other types of networks through which communication between the server and an external device may be established. Network interface(s) may be a network interface card, such as an Ethernet card, an optical transceiver, a radio frequency transceiver, or any other type of device that can send and receive information.

Storage devices of the processing circuitry of the present disclosure can be provided as part of a server to include one or more non-transient computer-readable storage media. Storage devices are generally configured to store larger amounts of information than memory. Storage devices can be configured for long-term storage of information. In some examples, storage devices can include non-volatile storage elements. Examples of non-volatile storage elements can include, but are not limited to, magnetic hard discs, optical discs, floppy discs, flash memories, resistive memories, or forms of electrically programmable memory (EPROM) or electrically erasable and programmable (EEPROM) memory.

Servers can include instructions that implement an image processing engine configured to receive images of damaged glass from one or more devices 18 and perform image processing on the images. The server can further include instructions that implement a damage estimation engine that receives the images processed by the image processing engine and, in conjunction with a database query an edit engine that has access to a database storing parts and labor costs, calculates an estimate for repair or replacement of the damaged motor vehicle glass.

Accordingly, user 16 can prepare or capture a plurality of images of motor vehicle glass 10, and these images can be uploaded to processing circuitry 20, and this processing circuitry can operate in accordance with the methods and systems disclosed herein, including interacting with a third-party processing circuitry 28 to process a claim 30.

Figure 3:
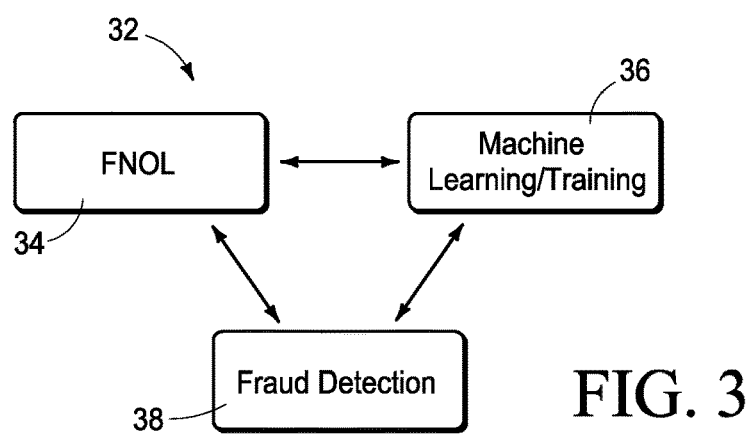
FIG. 3 is a representation of a process flow according to an embodiment of the disclosure.

Referring next to FIG. 3, processing circuitry 20 and methods used therein can include generally three method components that operate in most circumstances together to process claim 30. This module 32 can include module 34 that can acquire information for first notice of loss; module 36, which is machine learning and training, and module 38, which is fraud detection.

Module 34 is entitled "FNOL" (First Notice of Loss) can be filed using but not limited to a carrier web site, carrier app, or NCS interactive voice response system, for example. Additionally, the FNOL can be acquired using TPA as method and the NCS APP may interface with an insurance carrier's system. Accordingly, during First Notice of Loss, there is a series of proprietary questions; a "survey" can be initiated, including but not limited to: "Are you aware a claim has been filed on your policy?" "Did you notice the damage, or did a glass shop employee point it out?" "Has the work been done?" "If yes, why did the shop proceed without authorization?" Then, a description of the damages is requested; appearance, size, and quantity. Each filing of the FNOL method can utilize security features as part of the claim reporting process, including personal identification number, authorization, claim number, policy number and insured, multi-factor authorization to access policy information to avoid claim recycling (refiling claims within 180 days or per carrier specific guidelines) and verification of claim. Once the claim has been verified, the methods of the present disclosure can prompt the insured for required photos, including but not limited to those photos requested as will be described below. The Machine Learning and Training module 36 can utilize the information gained regarding specifics of a specific claimant, specifics of a specific car, specifics relating to glass type; also the Machine Learning and Training module 36 can utilize images acquired to determine the presence of a repairable chip; the presence of a repairable crack; or the presence of a chip and/or crack that cannot be repaired and requires glass replacement. Module 36 can be considered an artificial intelligence module. For example, the module can be software that includes and/or applies a set or sets of business rules that are used to develop and train fraud models and/or glass damage models under supervised learning. For example, models can be customized to detect fraud via prediction models that are monitored based on pre-defined business rules including but not limited to vehicle type, damage reported, vehicle location, owner of the vehicle and coverage type etc., as will be detailed herein. Also, the module can be configured to apply these same learning techniques to image capture and/or augmentation that is used to initiate vehicle glass damage identification and/or repair determination. For example, the preparation of additional images from single images of damage and the comparison of those images to image rules. The image rules including but not limited to previously categorized images of window damage.

Machine Learning module or AI 36 can be configured to utilize or incorporate the AI Provider's TensorFlow (See, for example tensorflow.org) image recognition technology for image recognition and/or analysis. It is contemplated that other AI technology may be used as well. This image recognition can capture the glass morphology and structural damage, for example. In accordance with example implementations, computer vision can be used to prepare extracts of glass damage information that describes the morphology and structure of glass damage via tagging tasks that provide for labeling of specific features (size and shape) of a given image. Classification of a given image can be based on specific detection tasks that are tied to pixel-level precision for image detection. Detection is followed with segmentation into pre-defined glass damage buckets based on ROLAGS standards.

Accordingly, module 32 also includes Fraud Detection module 38. Fraud Detection module 38 can include classification logic, which identifies correlations of various physical, vision, computing and data parameters to determine indicators of fraud. This module can proceed to either alert, reject, or pass or accept the claim per predefined requirements that improve over time with data collection and utilizing machine learning in accordance with module 36. Fraud Detection module 38 can run concurrently with the systems and methods herein, by cross-referencing photo indications with information gathered by third-party vendors 28 to identify characteristics including but not limited to Image Related Parameters, for example: color of vehicle different between photos; interior is a different color between photos; lighting is different from photo to photo; photos show vehicle inside a structure, then outside; shade band in some photos and not in others; frit band different from photo to photo; stickers showing in some photos and not in others; surroundings different photo to photo; photos identified to be from library or photo from the internet; as well as Vehicle Information, such as: glass LOGO doesn't match the type of vehicle; date and time stamp off; date and time stamp before Date of Loss (D.O.L.); geo tag is on some photos and not on others, geo tag is off; geo tag greater than a predefined number of miles from insured's address; photos from different phone number than that of the policyholder, for example.

Referring next to FIGS. 4A-4E, an example overall method is shown as part of a system for submitting an insurance claim for the damaged motor vehicle glass in FIGS. 4A-4E. Clearly this overall method is too large to be printed on a single sheet as a diagram; therefore, it is provided in components. First, we will address the steps in FIG. 4A. In step 40, a software application or "app" is initiated by the user. This could be a non-transitory computer readable storage medium storing instruction that executes a prompt for the user to initial claim submission information. In accordance with example implementations, this processing can include a mobile device registering sequence. This can be a requirement to register a "mobile number" such as phone number, with the system to obtain a unique ID registration code for the user. In accordance with other implementations, a deeplink paste through a text or email can be used to register. In this system, the next step 42, the claim submission information can be web initiated or initiated through a website or via cloud based system. In step 44, the carrier or third-party agent can be initiated, and then in step 45, an automated phone system can be initiated. At step 34, the First Notice of Loss module is initiated or entered. From there, in step 46 there is an inspection protocol, and following from that inspection protocol can be a proof of loss concept 48, and then a photo request that also provides from inspection protocol 50. Additionally, these steps as well as other steps in the system can be completed with UI/UX tools that guide a user the methods and/or systems. For example, image guidance, instruction guidance, voice guidance, video guidance, video tools, FAQ pages, and/or a Chat Bot.

Figure 4A:
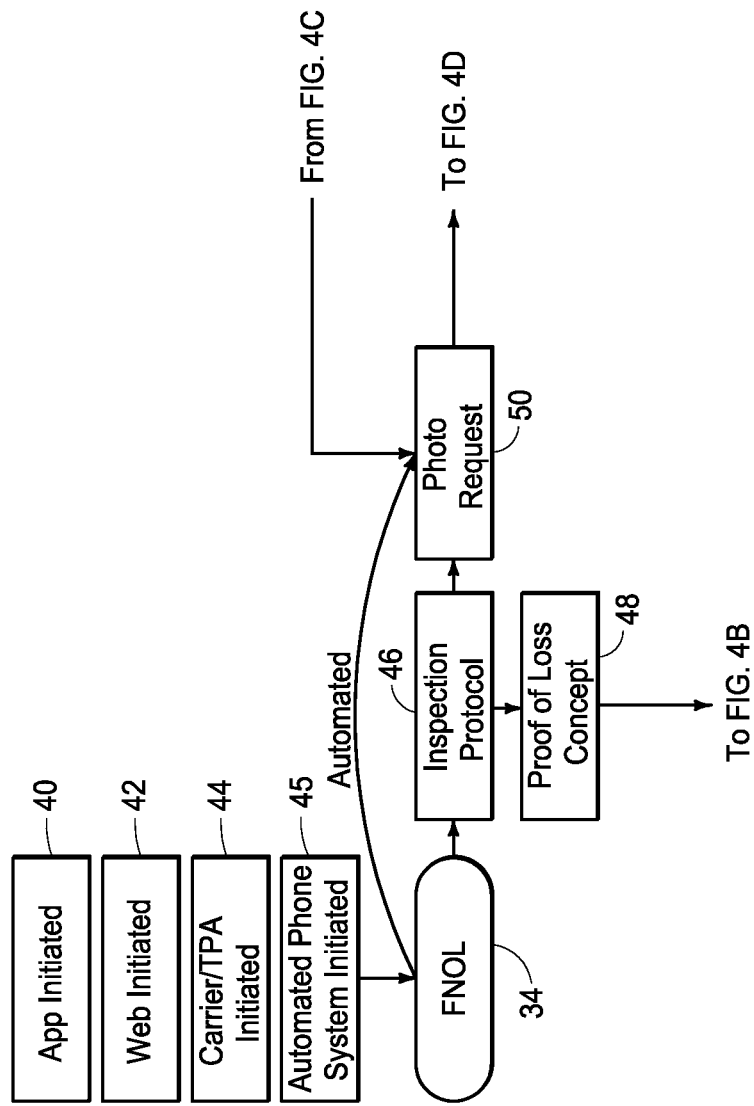
FIG. 4A is a represented portion of an overall method as part of a system for automatically generating and/or processing insurance claims.
Figure 4B:
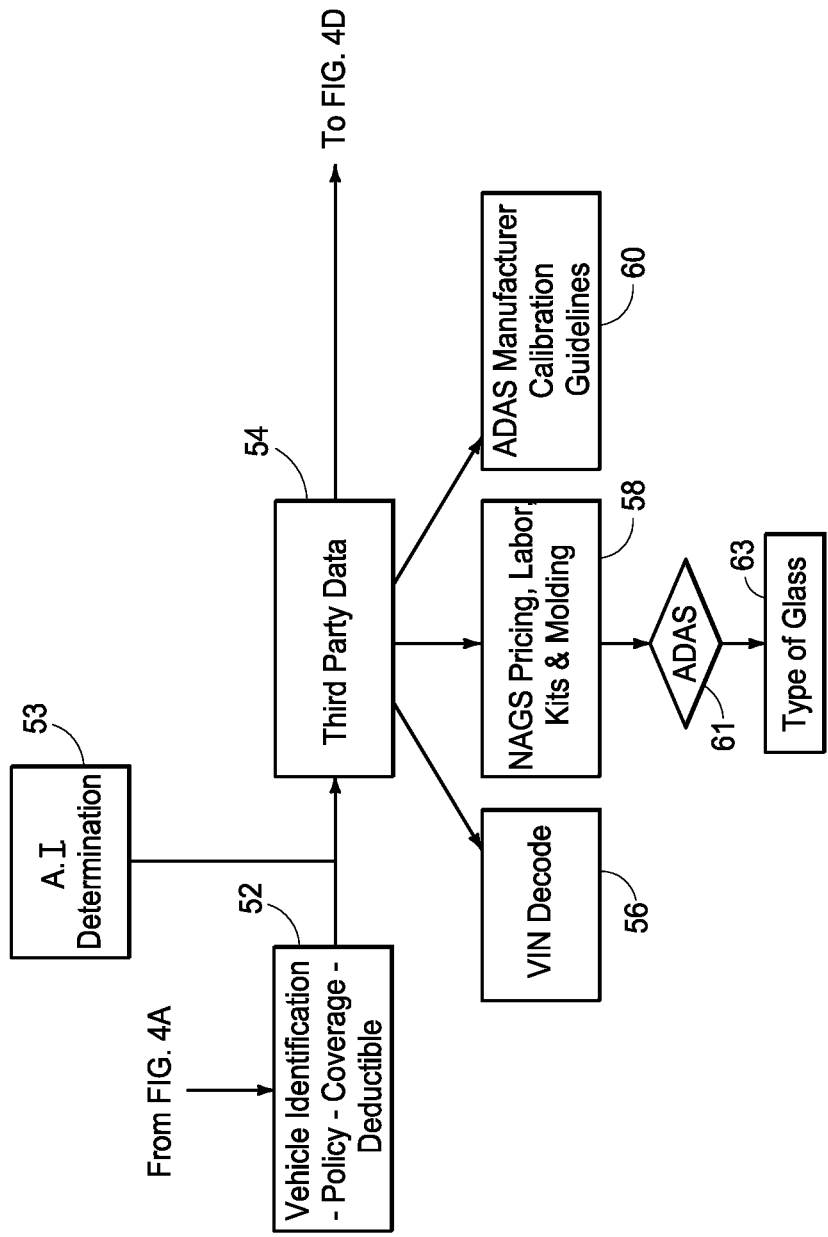
FIG. 4B is a represented portion of an overall method as part of a system for automatically generating and/or processing insurance claims.

Referring next to FIG. 4B, upon completing step 48 for the proof of loss, a vehicle identification and policy coverage deductible can be entered by the user at 52 and third-party data is acquired at 54. Third-party data acquisition can include a VIN decode, NAGS part information including labor kits and molding, or ADAS manufacturer calibration guidelines in 56, 58, and 60. From there, a decision regarding the presence or absence of an ADAS component can be made at 61 and from there a type of glass decision can be made at 63 and rendered by the system. Entering the third party data 54 is not always performed. For example, where glass does not need to be replaced, but can be repaired, third party data processing 54 can be by passed and the system can proceed to the methods of FIG. 4D. Accordingly, not all VIN's received by the system necessarily enter third party data processing 54. This determination can be made during the processing of step 74. For example, during AI determination, repair or replace can be determined. If repair, then step 53 allows third party data step 54 to be bypassed. If replace, then step 53 can require third party data step 54 processing.

Referring next to FIG. 4C, from step 80 (FIG. 4D), either or both of fraud detection or photo failure can be made to proceed to failure photo step 68 and/or fraud detection 70. Accordingly, there is a failure photo decision at 68 that can include a part of a fraud detection component 70, which is at least one part of the link between the FNOL fraud detection component and the machine learning component. From there, during this acquisition, a determination can be made whether the photos are sufficient or not at a decision 64 (requiring technical assistance), and if necessary, technical support can be provided at 66. Automated prompts can be given by the system for the acquisition of photos at step 62 and a return to photo request at step 50 of FIG. 4A.

Figure 4D:
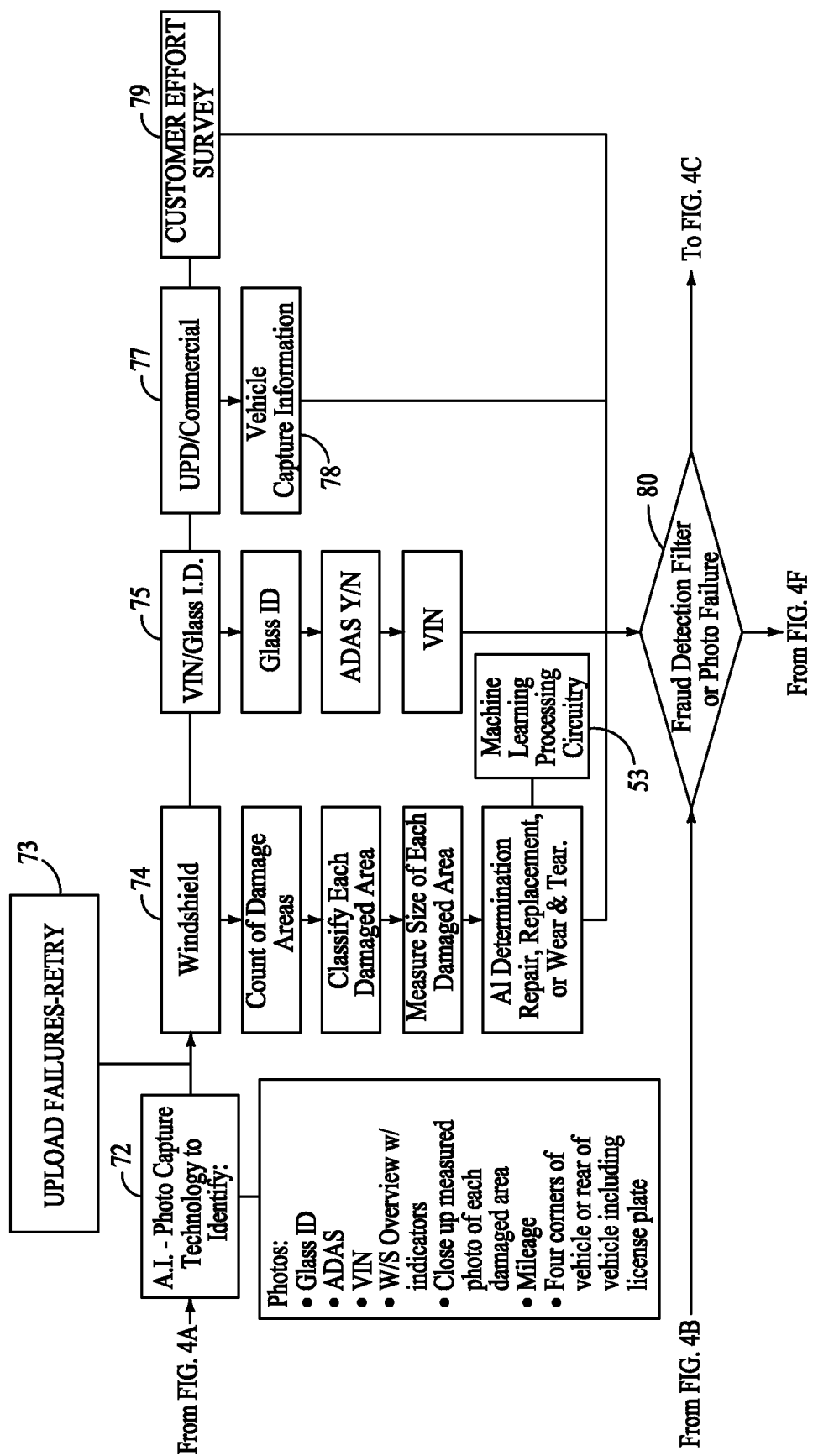
FIG. 4D is a represented portion of an overall method as part of a system for automatically generating and/or processing insurance claims.

Referring next to FIG. 4D, an example machine learning system is described with reference to the damaged motor vehicle glass claim submission systems and methods of the present disclosure. Accordingly, after step 50, the photos can be provided to a machine learning at step 72. The photos include, but are not limited to, as will be described later, the glass ID, ADAS camera, the VIN number, the glass overview with indicators 500 or 700, see for example, FIG. 5E and/or FIG. 7B, close up measured photo of each damaged area, mileage, and vehicle capture information such as images of the four corners of the vehicle and/or rear of vehicle including license plate.

Prior to proceeding to step 74, upload failures where photos were captured by the user, but failed to be received by the system for processing prior to step 74, can be validated and retried through a job batch scheduling method at step 73 that operates when system capacity is favorable. In accordance with example implementations, photos can be requested in step 50 and provided, however, the photos acquired in step 72 failed to upload for processing in 74. For example, cameras placed within about 10 inches from the glass when capturing images have proven effective to provide the images, but these images may fail to be uploaded. Accordingly, the uploading of these photos can be attempted again at step 73.

Proceeding next to step 74, motor vehicle glass can be analyzed for count of damage areas, classify each damaged area, measure size of each damaged area, and an AI determination of repair, replacement or wear & tear. For example, a measured photo can include, but is not limited to, the inclusion of certain known reference materials, such as currency, ruler, any other objective reference matter. During this step, the images, particularly the images of the damaged glass can be augmented. For example, an overview image can be taken such as FIG. 5F. The glass itself can be augmented with physical markers such as the adhesive tags 500 shown in FIG. 5E. The system can be configured to recognize these tags by color or oddity (for example, they don't belong) and zoom in to these portions creating images for processing. Alternatively, the glass can be digitally augmented in accordance with FIG. 7B, wherein the user displays the image on an interface then touches or marks the image at the location of the damage 700. The marked or augmented image can then be processed focusing on the marked or augmented portions.

Additionally, upon completion of the AI determination of the steps of 74, a threshold for using third party data can be established. Accordingly, where the AI determination is to "replace", the system can proceed between 52 to 54 of FIG. 4B. Where the AI determination does not include a "replace" conclusion, the system may not access or use third party data at step 53.

Following step 74 can be step 75, which includes VIN number and glass ID, whether or not the glass ID matches the VIN number, and whether or not the VIN number indicates the presence or absence of an ADAS and/or whether or not the VIN number matches the VIN number submitted by the user. Referring next to step 77, the Unrelated Prior Damage (UPD) or commercial use can be determined, and vehicle capture information such as the four corners of the motor vehicle or rear and/or vehicle including license plate can be captured information in step 78. This information can be provided to the fraud detection determination in step 80 referenced in FIG. 12A-12B.

Figure 4E:
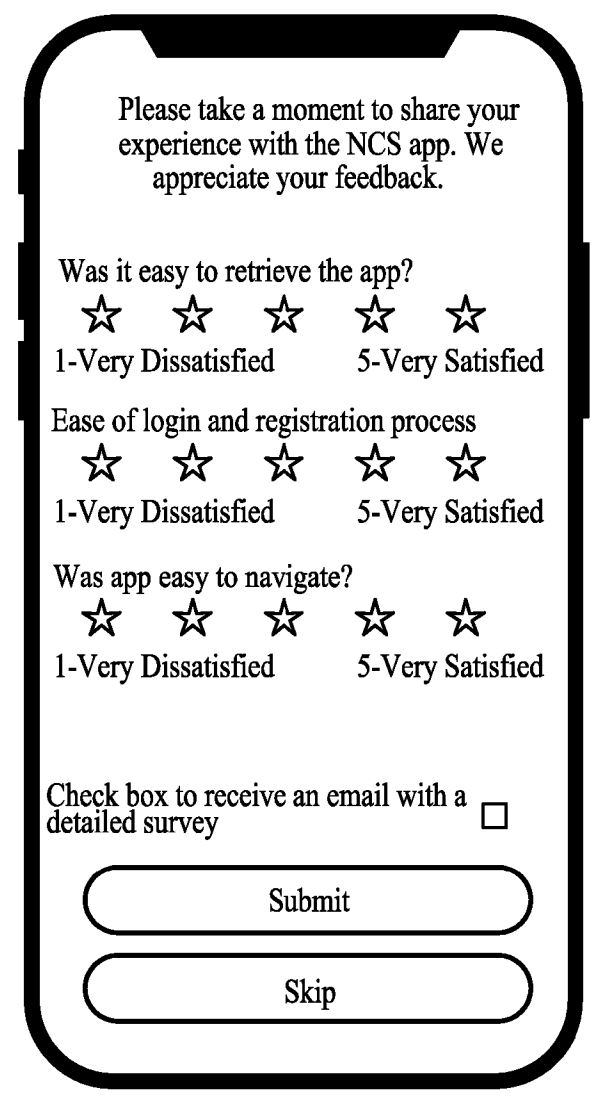

Additionally, step 79 customer effort survey can provide feedback on tools used for UI "User Interface"/UX "User Experience" for example Image Guidance, Instructional Guidance, Voice Guidance, Video Tools, FAQ Information and Chat Bot. Questions for example; Was it Easy to Retrieve APP, Ease of Login & Registration Process, Was APP easy to Navigate, and Option to send additional Survey Request. Subject matter of 74, 75, 77 and/or 79 can be used in decision step 80, and example prompt screen for which is shown in FIG. 4E.

Figure 4F:
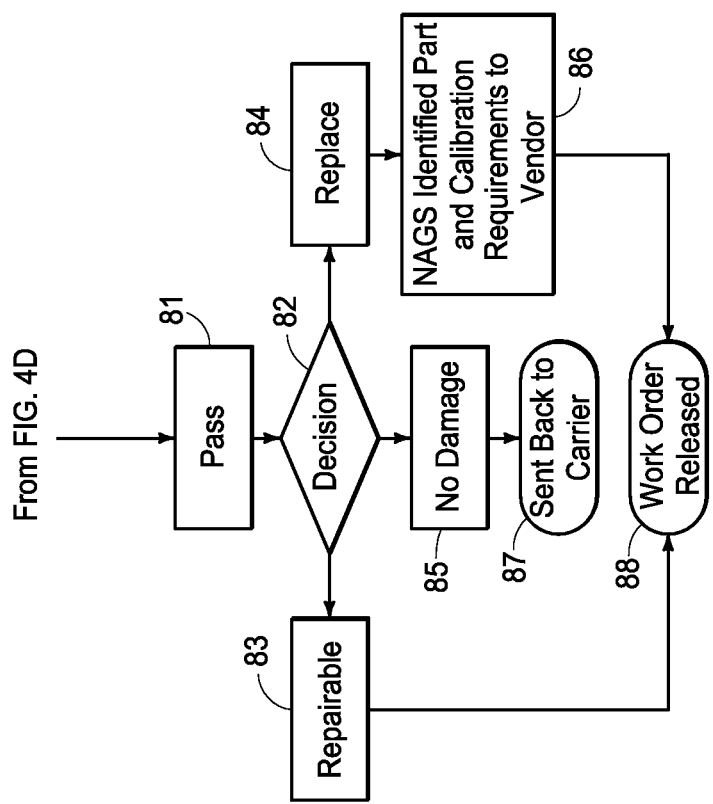
FIG. 4F is a represented portion of an overall method as part of a system for automatically generating and/or processing insurance claims

Referring next to FIG. 4F, a determination of fraud detection is made in step 82 after AI determination of pass in step 81, and this decision can determine repairable in 83 or replace in 84, or no damage in 85. This can be done on an autoglass-by-autoglass basis, or on a photo-by-photo basis. If there is a replacement window, NAGS identified part and calibration requirements can be sent to the vendor in 86. Build sheet data can be used in combination with a translation table to secure the NAGS part number, for example. If there is no damage, then the claim is sent back to the carrier in 87. If there is a replace or repairable determination, a work order is generated and released in 88.

Figure 5A:
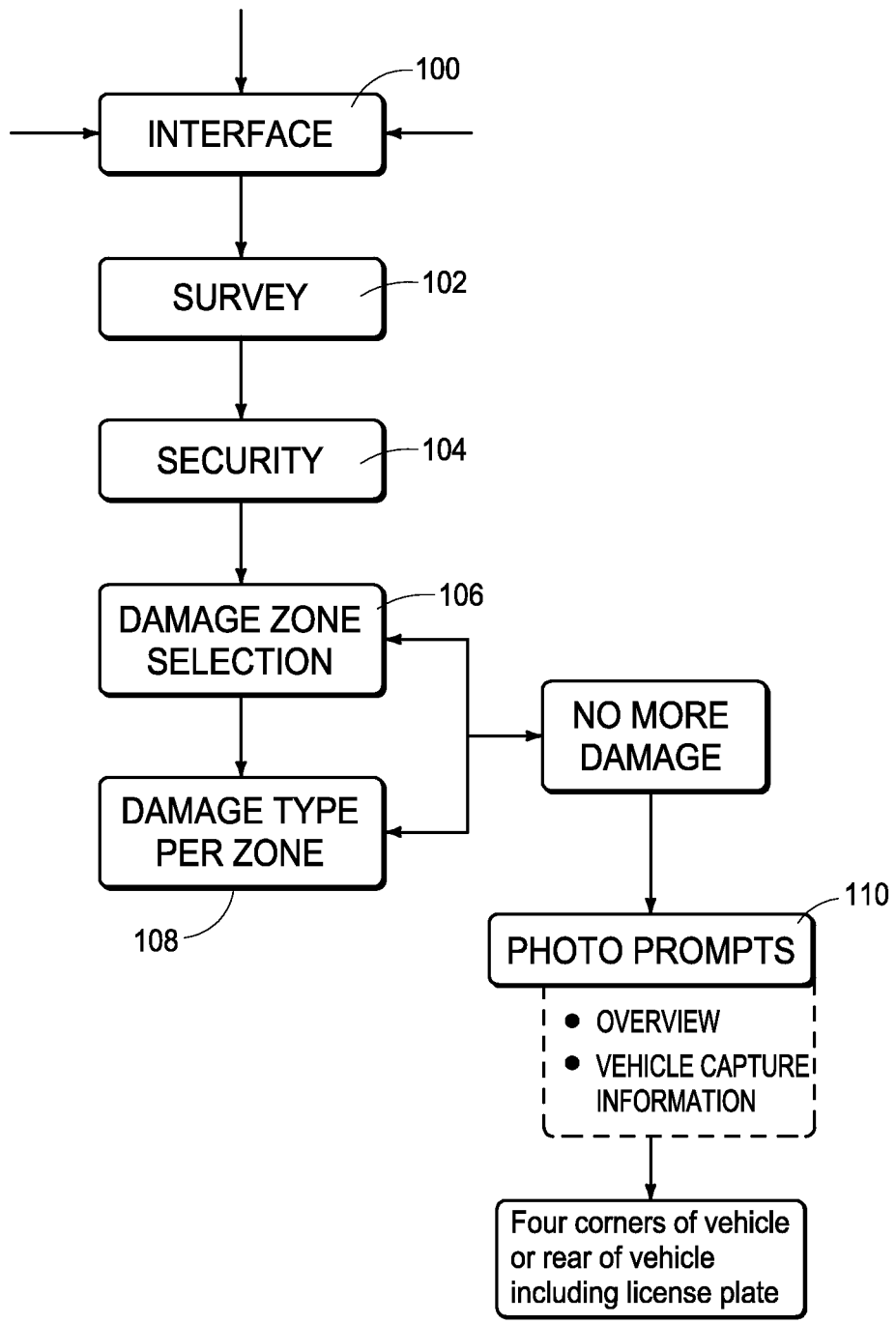
FIG. 5A is a more detailed portion of the system and/or methods shown in FIG. 4.
Figure 5B:
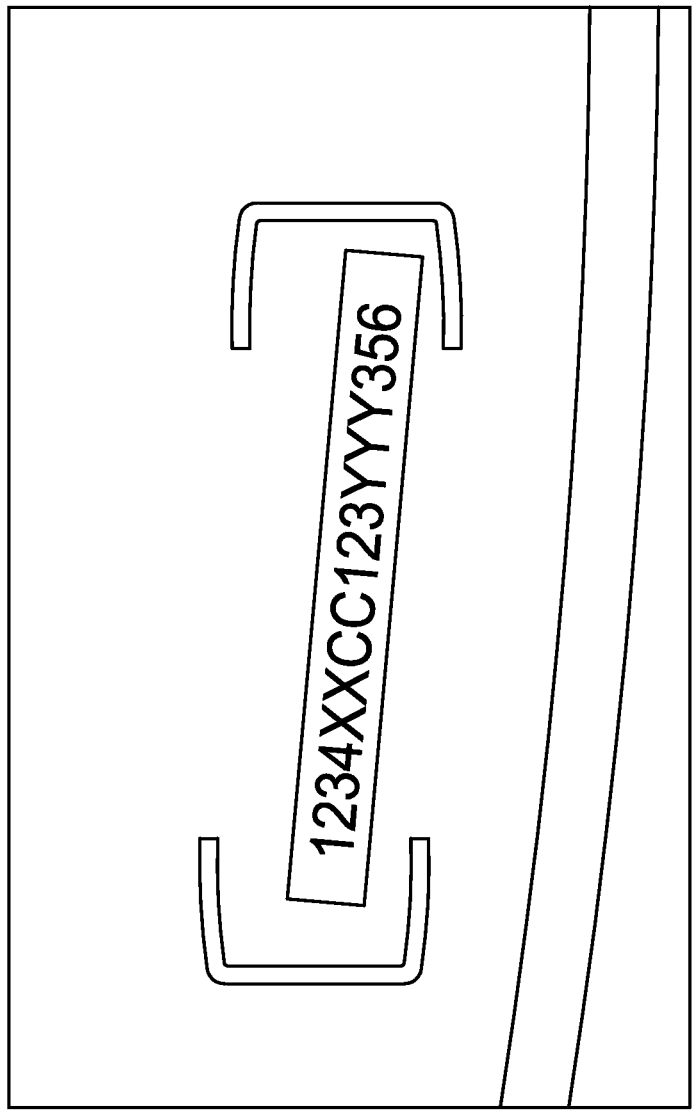
FIG. 5B is a depiction of motor vehicle glass image registration according to an embodiment of the disclosure.
Figure 5C:
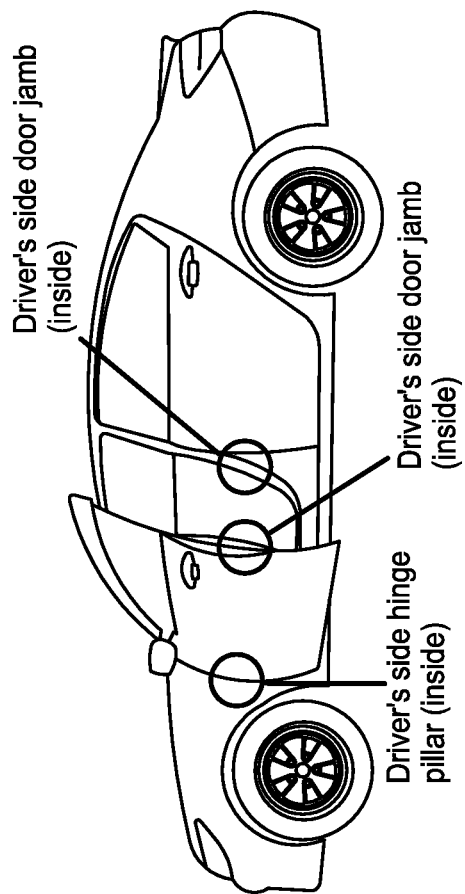
FIG. 5C is a depiction of motor vehicle identification points according to an embodiment of the disclosure.
Figure 5D:
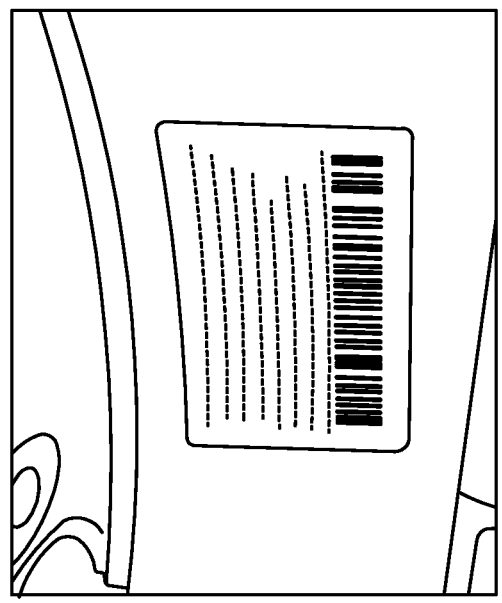
FIG. 5D is a depiction of a particular motor vehicle highlighting a specific motor vehicle tag.

Referring next to FIG. 5A, an example method of the first notice of loss is described in more detail or with reference to another example implementation, wherein an interface 100 can include as described herein a camera or a personal digital assistant or cell phone or laptop computer, for example. Survey questions are initiated to the user in step 102, and security information is initiated to the user in step 104. The system prompts the user to capture images as described in step 72 of FIG. 4D. Referring to FIG. 5B, an example depiction of VIN # image registration is shown. In accordance with example implementations a user can launch an NCS VIN scanner Application. The NCS VIN scanner Application utilizes a barcode reader, QR code reader and includes a built-in OCR text reader with autofocus. The Mobile APP can prompt the user to align the vehicle VIN within a rendered bracket frame as shown. VIN registration can be completed after alignment and autofocus criteria are met. In accordance with additional implementations, and with reference to FIG. 5C, the user can acquire a VIN # image. An example VIN # image is shown in FIG. 5D. The system can use this image to identify the year, make, model of vehicle, build features and part selection.

Figure 5E:
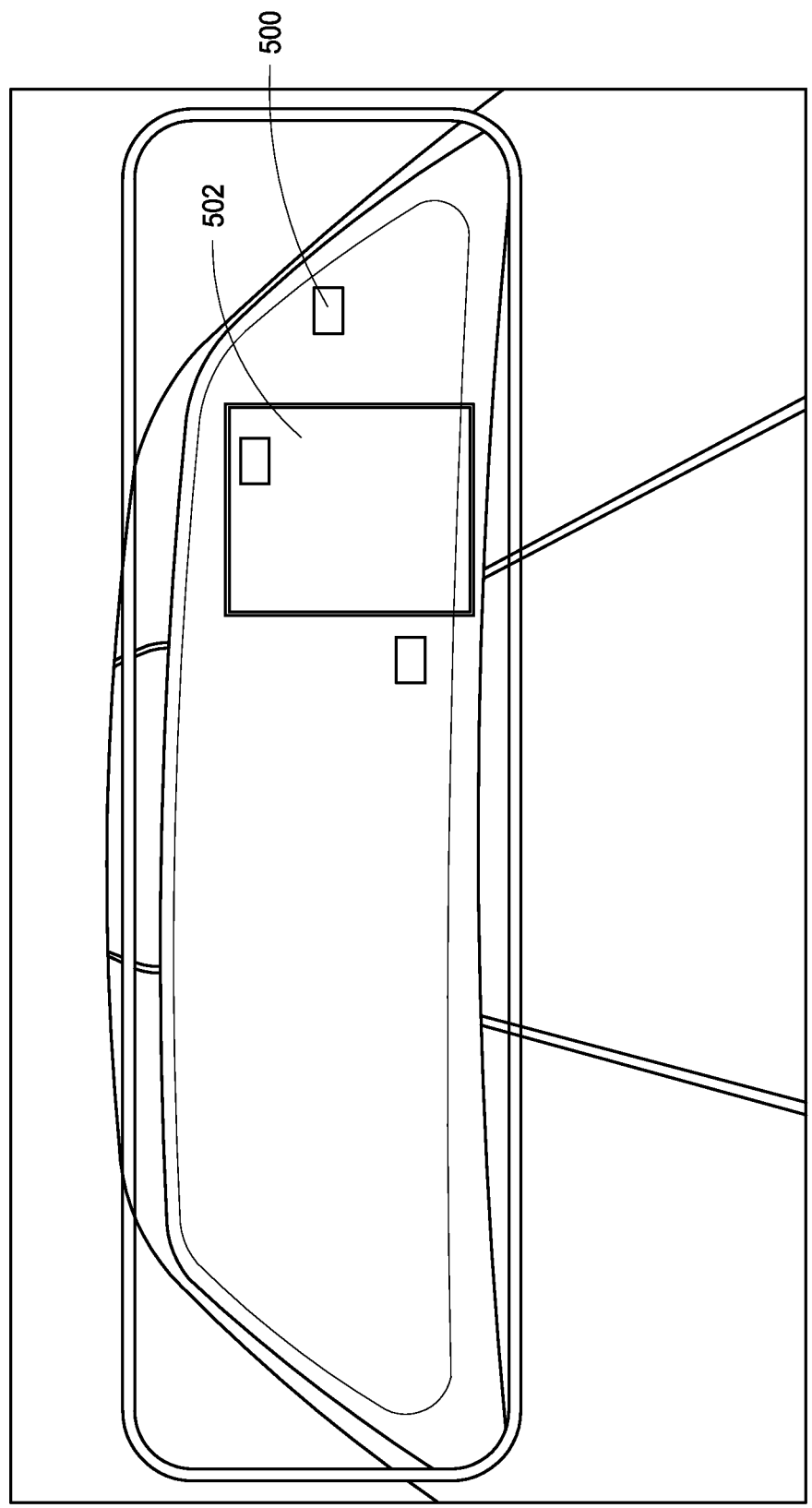
FIG. 5E is a depiction of motor vehicle Drivers Primary Viewing Area (DPVA) according to an embodiment of the disclosure.
Figure 5F:
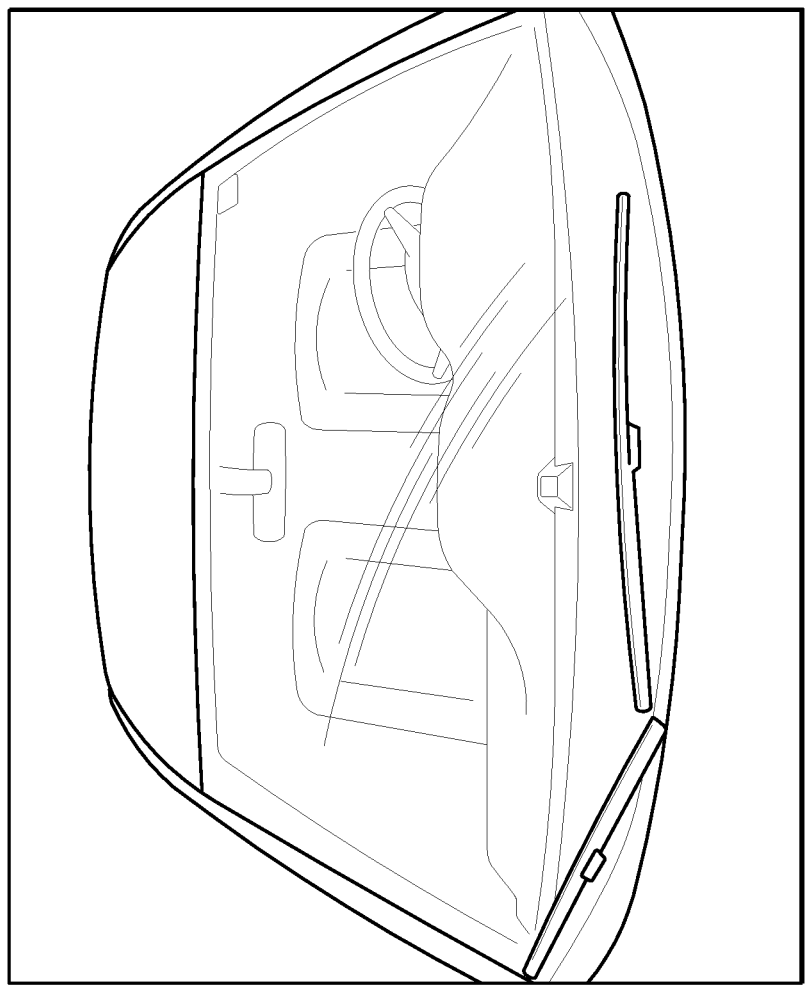
FIG. 5F is a depiction of an overview to be altered by touching the screen to indicate the location of the damage.

Referring to FIG. 5E an example motor vehicle Drivers Primary Viewing Area (DPVA) is shown. In accordance with example implementations, a user can launch an NCS windshield photo Application which launches a windshield image capture Mobile APP. The NCS windshield Mobile APP can prompt the user to align the motor vehicle glass image within a rendered frame as shown. Motor vehicle Drivers Primary Viewing Area (DPVA) is complete after alignment and autofocus criteria are met. In accordance with another implementation, and with reference to FIG. 5F, an NCS APP photo of an overview to be altered by touching the screen to indicate the location of the damage.

Figure 6:
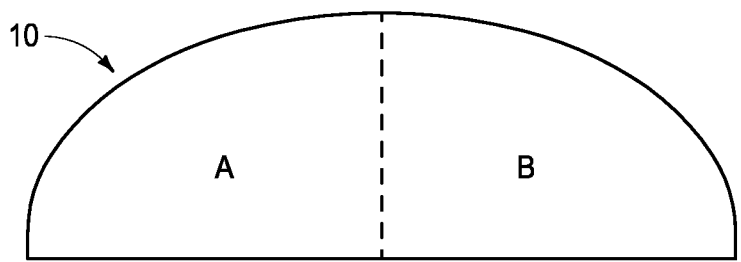
FIG. 6 is a depiction of a car windshield having at least two portions.

Accordingly, and with reference to FIG. 6, the windshield 10 can be divided into portions, for example, A and B at the very least, but these portions are commensurate with the prompting of portions by the systems and methods of the present disclosure.

Figure 7A:
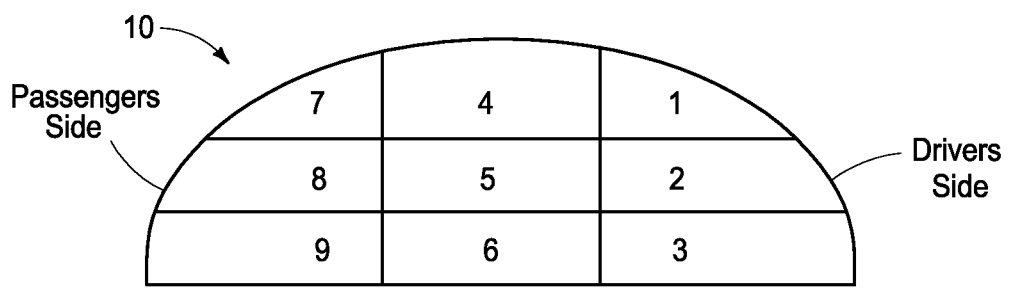
FIG. 7A is a depiction of a car windshield having at least 9 portions, with each of the portions having a unique identifier.
Figure 7B:
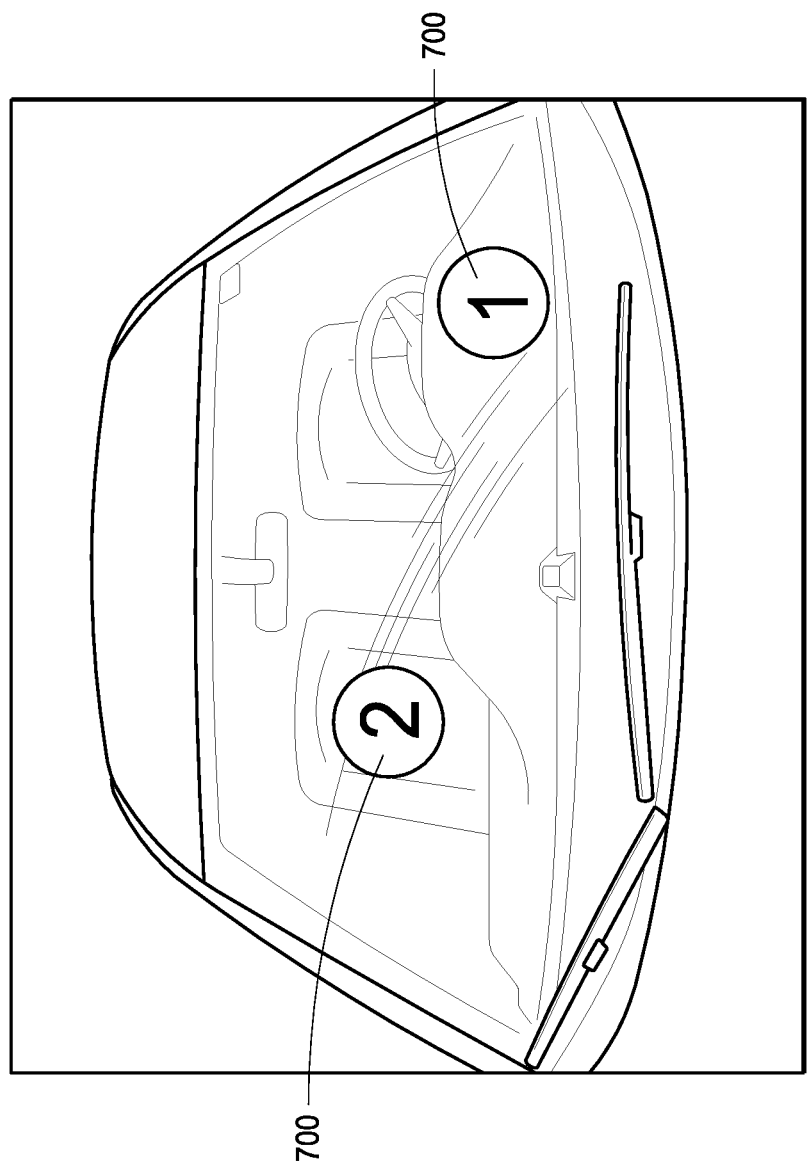
FIG. 7B is a depiction of the altered overview (FIG. 5F) with identifiers upon a windshield according to an embodiment of the disclosure.

Referring to FIG. 7A, an even more detailed depiction of portions 10A and 10B is shown wherein there are 9 portions, each of the 9 portions having a specific designation. Accordingly, within these "damage zones" the system can request that you enter each of these pictured portions in the designated order to place them with the proper identifier. Referring to FIG. 7B, identifiers are placed manually or are created electronically via the Mobile APP touch screen process to identify damages. The identifiers are placed manually or are created electronically via the Mobile APP touch screen to identify areas of damage.

Figure 8:
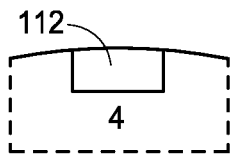
FIG. 8 is portion 4 of FIG. 7A.
Figure 9:
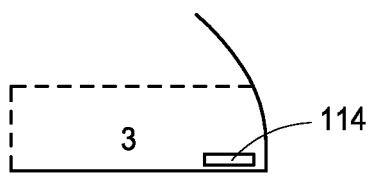
FIG. 9 is portion 3 of FIG. 7A.
Figure 10A:
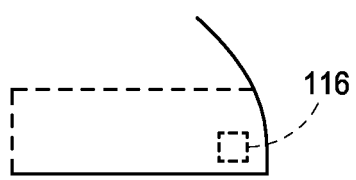
FIG. 10A is portion 3, 6 or 9 of FIG. 7A.
Figure 10B:
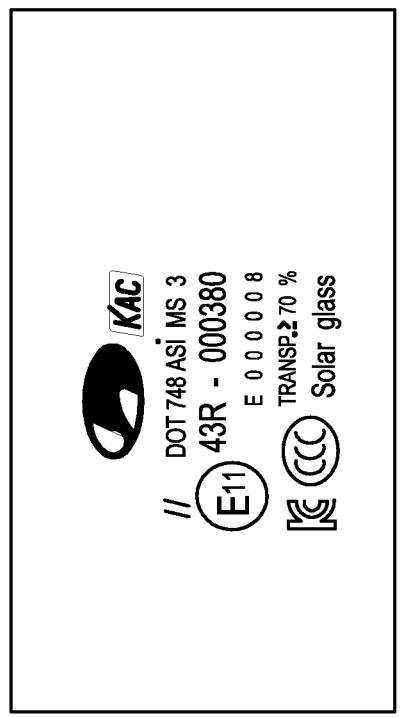
FIG. 10B is a depiction of an example glass identifier according to an embodiment of the disclosure.

Accordingly, and with reference to FIG. 8, portion 4 in FIG. 7A may include a depiction of an ADAS 112. A portion 3 in FIG. 7A can include VIN 114 as shown in FIG. 9. A portion 3, 6 or 9 in FIG. 7A, can include glass ID 116 as shown in FIGS. 10A and 10B.

Figure 11A:
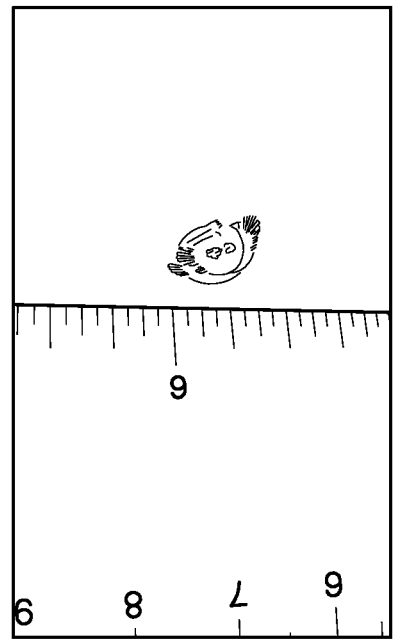
FIGS. 11A-11G are depictions of different forms of damaged motor vehicle glass breaks.
Figure 11B:
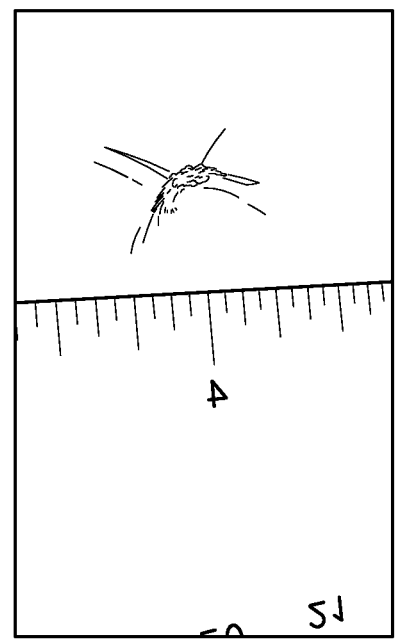
Figure 11C:
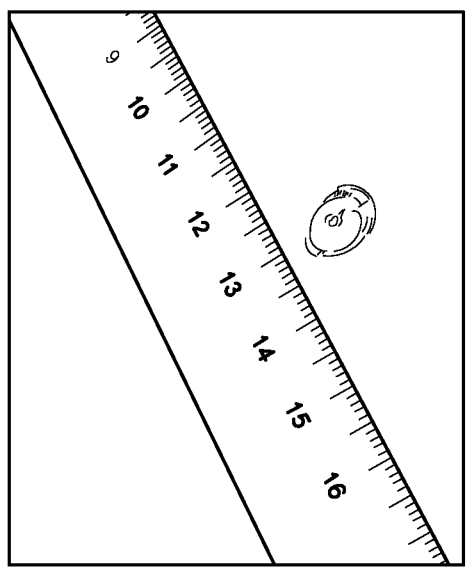
Figure 11D:
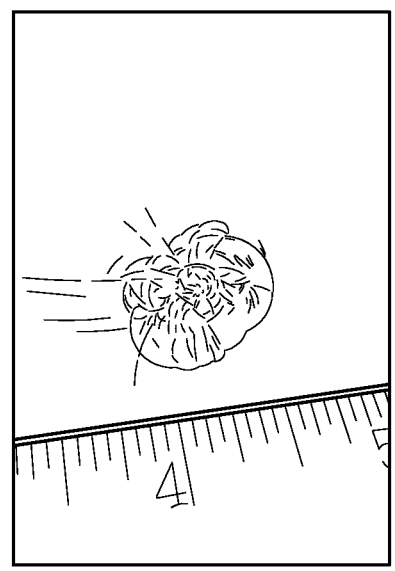
Figure 11E:
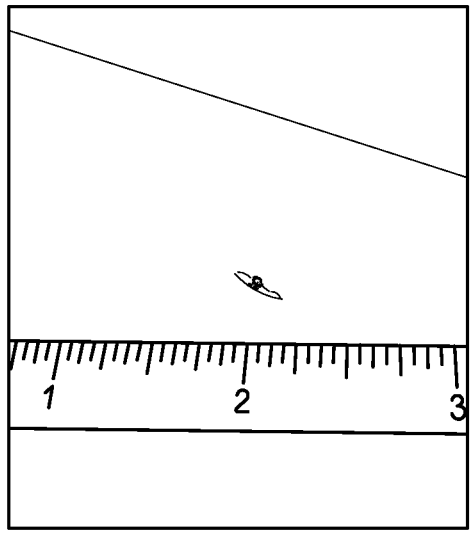
Figure 11F:
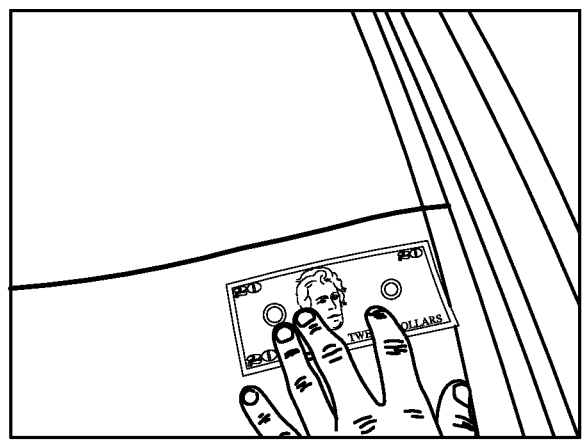
Figure 11G:
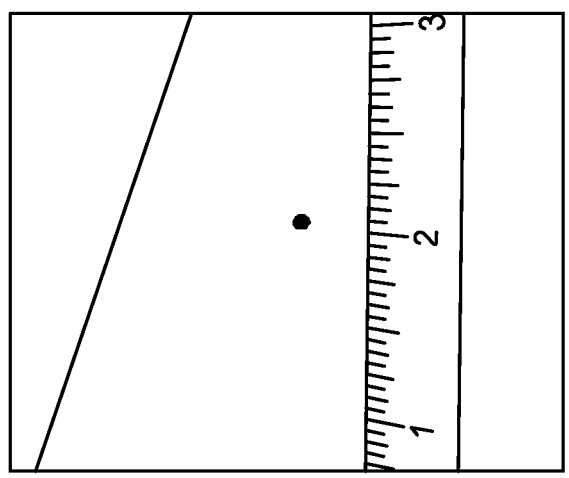
Figure 11G:
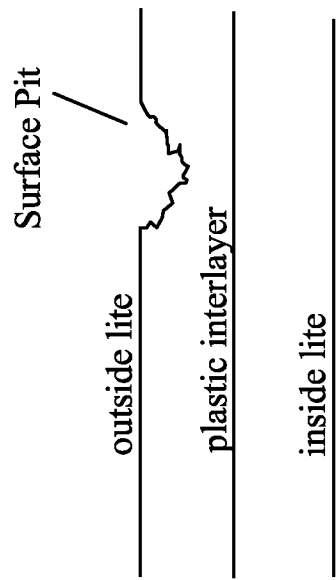

In accordance with example implementations, and with reference to FIGS. 11A-11E, example windshield chips are shown, with FIG. 11A representing a half moon chip of the size shown; FIG. 11B representing a star chip of the size shown; FIG. 11C representing a bullseye chip of the size shown; FIG. 11D showing a combo chip of the size shown, and FIG. 11E showing a batwing chip of the size shown; FIG. 11F showing a crack of the size shown; and FIG. 11G showing a surface pit extending into outside lite, but not through the plastic interlayer and/or into the inside lite of the window. Accordingly, and with reference to FIGS. 12A and 12B, a more detailed example of fraud detection is shown, wherein the instances are weighed to determine whether or not fraud exists, and each of these instances or inconsistencies can be given a certain weight, and then totaled, and this totaled weight can be given an amount that is either above or below the fraud threshold. Accordingly, in step 200, details are received, and in step 202, the individual details are processed. In step 204, the vehicle color is compared between the photos and in 206, the vehicle interior color is compared between the photos. The lighting of the photos is compared for consistency in 208; the setting of or pose of the motor vehicle, particularly the windshield, is compared in 210; the presence of shade bands in the photographs is compared in 212; the frit band associated with the photographs is compared in 214; and the stickers across the different portions of the photographs are compared in 216. The surroundings to the vehicle are compared in 218; historical photos of the vehicle, if available, are compared in 220; and the windshield logo, if any, is compared with that which should exist in 224; and the date and time stamp of the photos is compared in 226, for example.

Figure 12A:
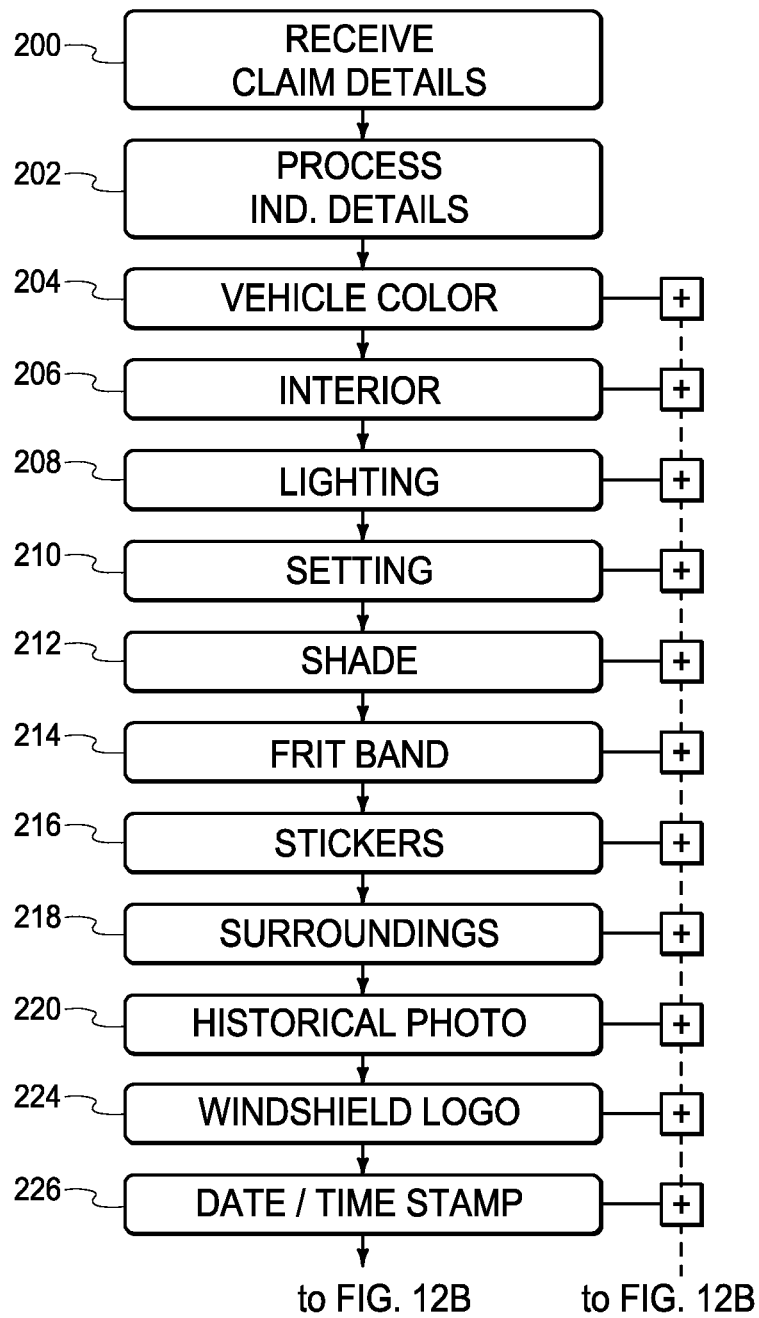
FIGS. 12A-12B are more detailed portions of the overall system and method shown in FIGS. 4A-4E.
Figure 12B:
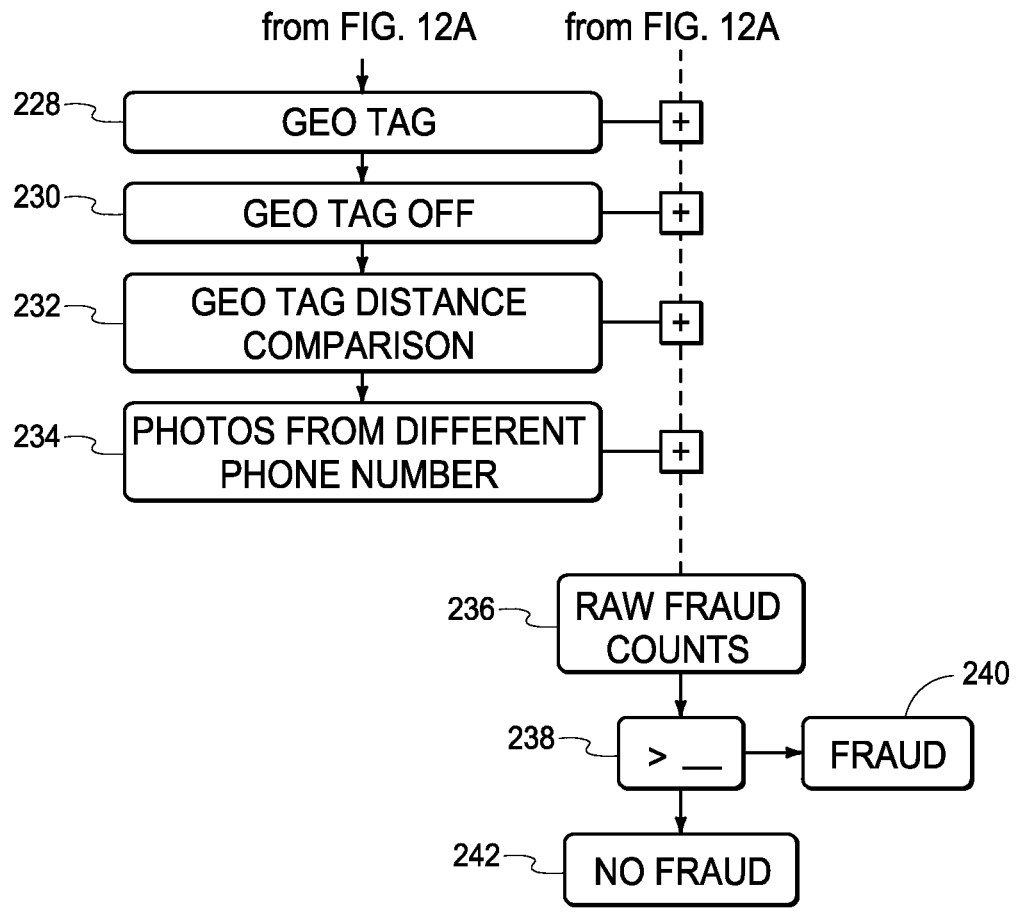

With reference to FIGS. 12B, continuing on, the GEO tag of the photos is compared in 228, and whether or not the GEO tag was on or off is determined in 230. The GEO tag distance of a predetermined number of miles from the insured's address in comparison to that of the photos is made in 232, and a determination of whether the photos were from different device ids (e.g., those generated from different phone numbers, texts, emails, etc.) is made in 234. Raw fraud counts are made in 236, and if it achieves a threshold number in 238, then fraud is determined in 240, or no fraud is determined in 242.

Figure 13:
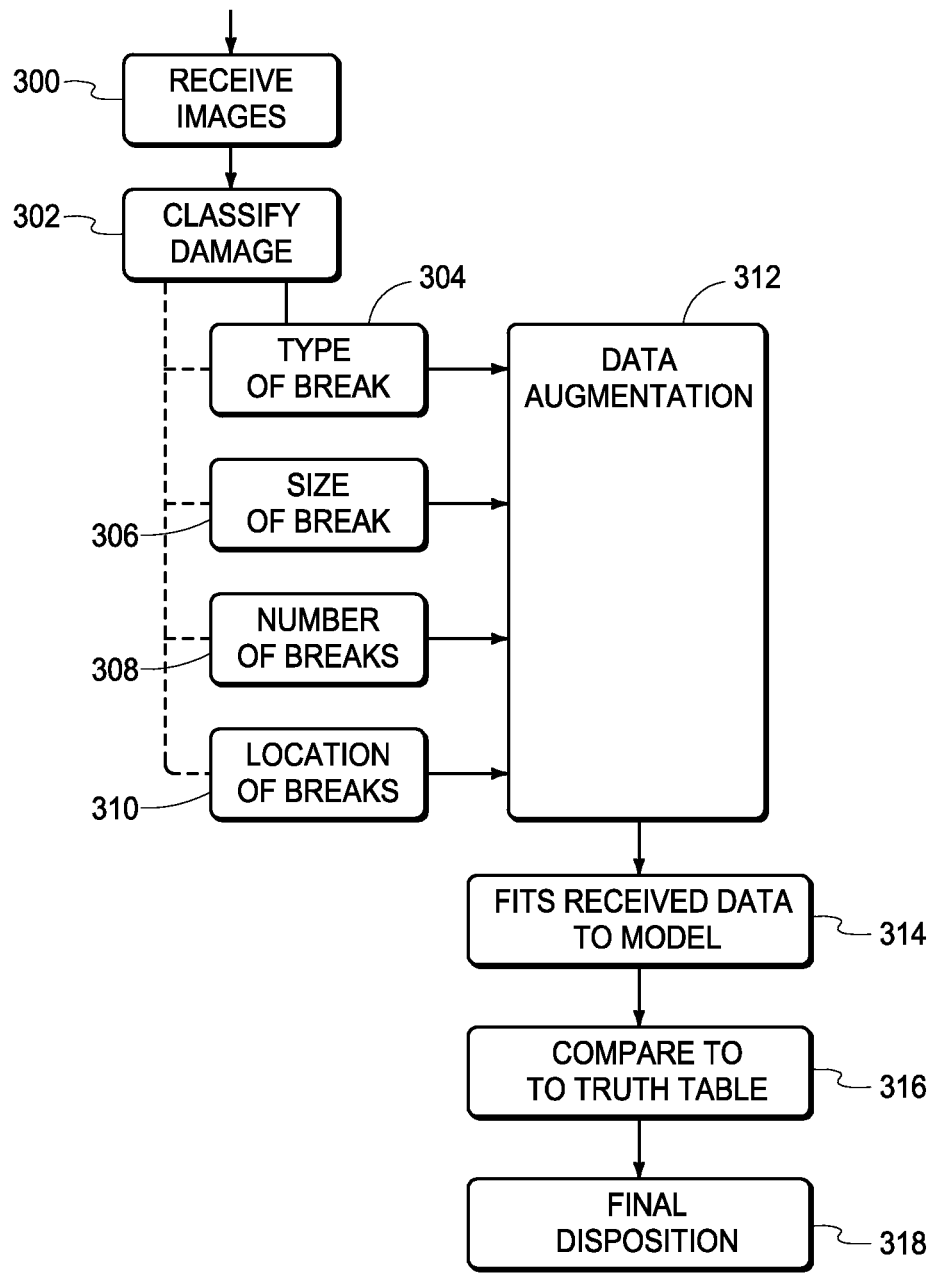
FIG. 13 is a more detailed representation of the overall system shown in FIGS. 4A-4E.

Referring next to FIG. 13, an example implementation of a machine learning relating to the images is shown, wherein images are received in step 300, and the damage classified in step 302 by the type of break at 304, the size of the break in 306, the number of breaks per image in 308, and the location of the breaks on the windshield itself in 310. This machine learning is done first with data augmentation at 312 (example implementations are described with reference to FIGS. 5E and 7B), and then the system fits received data to model in 314 and compared to the truth table as described, for example, in FIGS. 12A and 12B, at step 316, for a final disposition regarding fraud and/or replacement or repair of the windshield at 318.

Figure 14:
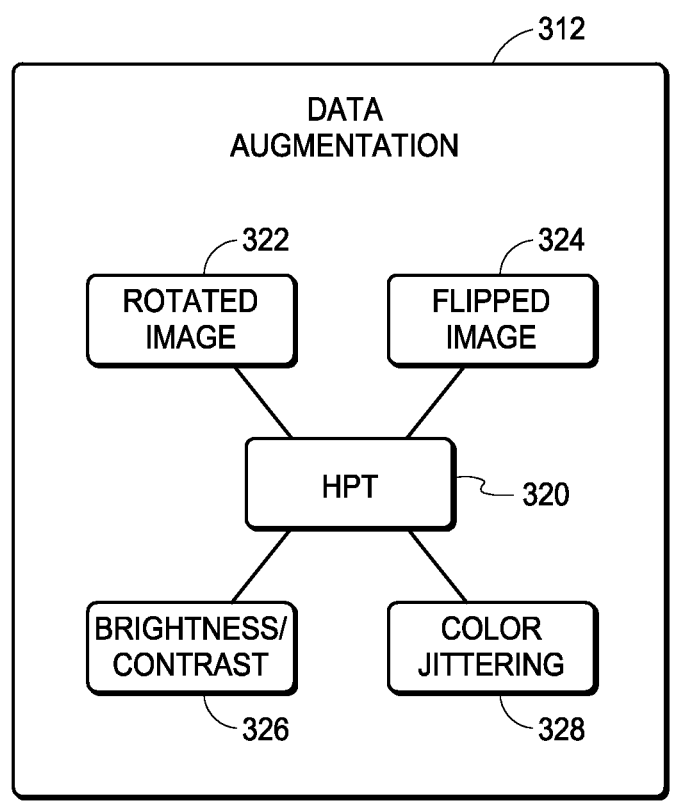
FIG. 14 is an even more in-depth depiction of the overall system and methods shown in FIGS. 4A-4E.

Referring next to FIG. 14, data augmentation example step 312 is shown with an HPT driver or programming 320 preparing rotated image at 322, flipped images at 324, and brightness or contrast changed images at 326, and color jittering at 328.

Figure 15:
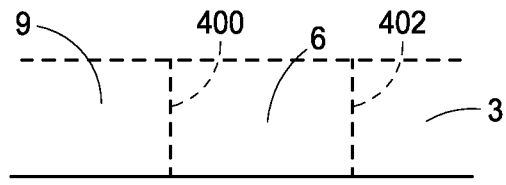
FIG. 15 is a depiction of a group of portions of motor vehicle glass according to an embodiment of the disclosure.

In accordance with example implementations and with reference to FIG. 15, as part of data augmentation, the images that are next to each other, for example, 9, 6, and 3 can have the perimeters associated with those images, for example, perimeter 400 and 402, compared to ensure that they are overlapping with existing images as part of fraud detection.

Figure 16:
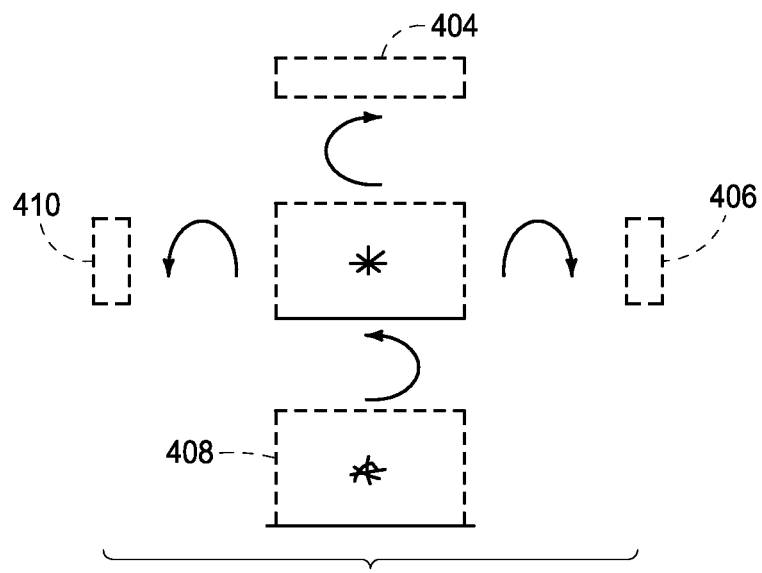
FIG. 16 is a depiction of image augmentation according to an embodiment of the disclosure.

Referring next to FIG. 16, an example image, in this case 6 can be rotated or flipped as part of data augmentation to create additional images 404, 406, 408, and 410. These images can be stored for later use as representative of a certain chip 12.

Figure 17:
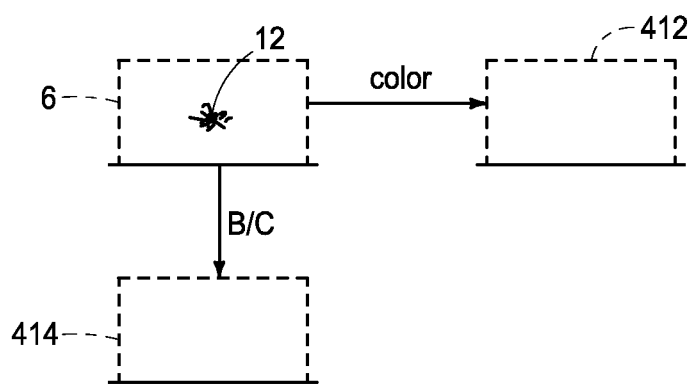
FIG. 17 is another depiction of image augmentation according to an embodiment of the disclosure.
Figure 18A:
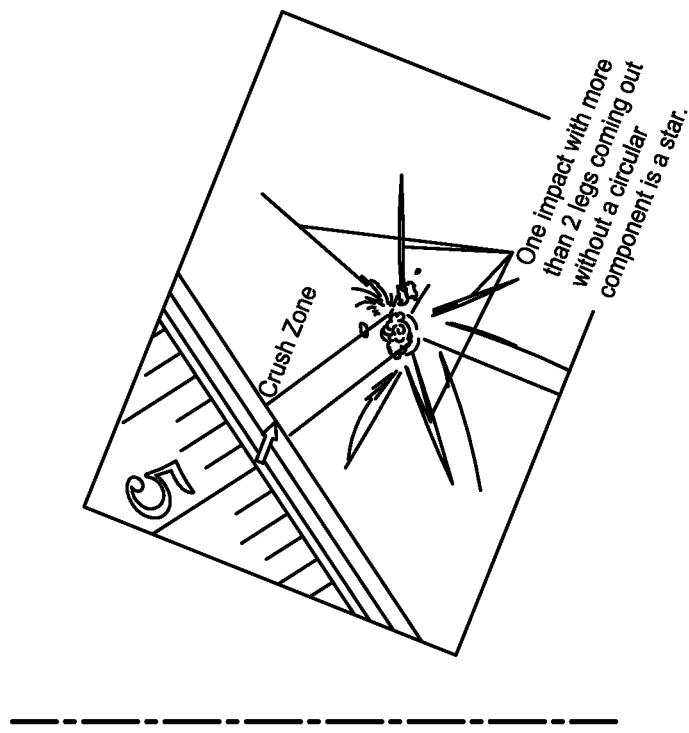
FIGS. 18A-18D are depictions of image augmentation according to an embodiment of the disclosure.
Figure 18A:
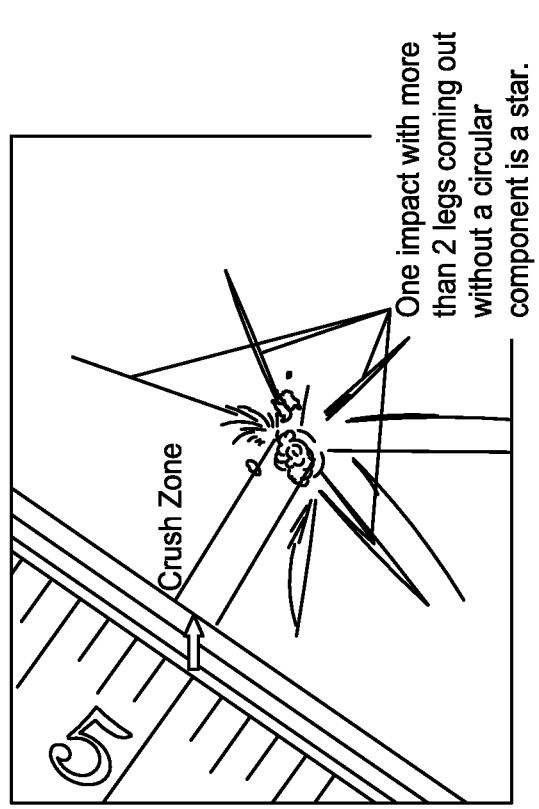
Figure 18B:
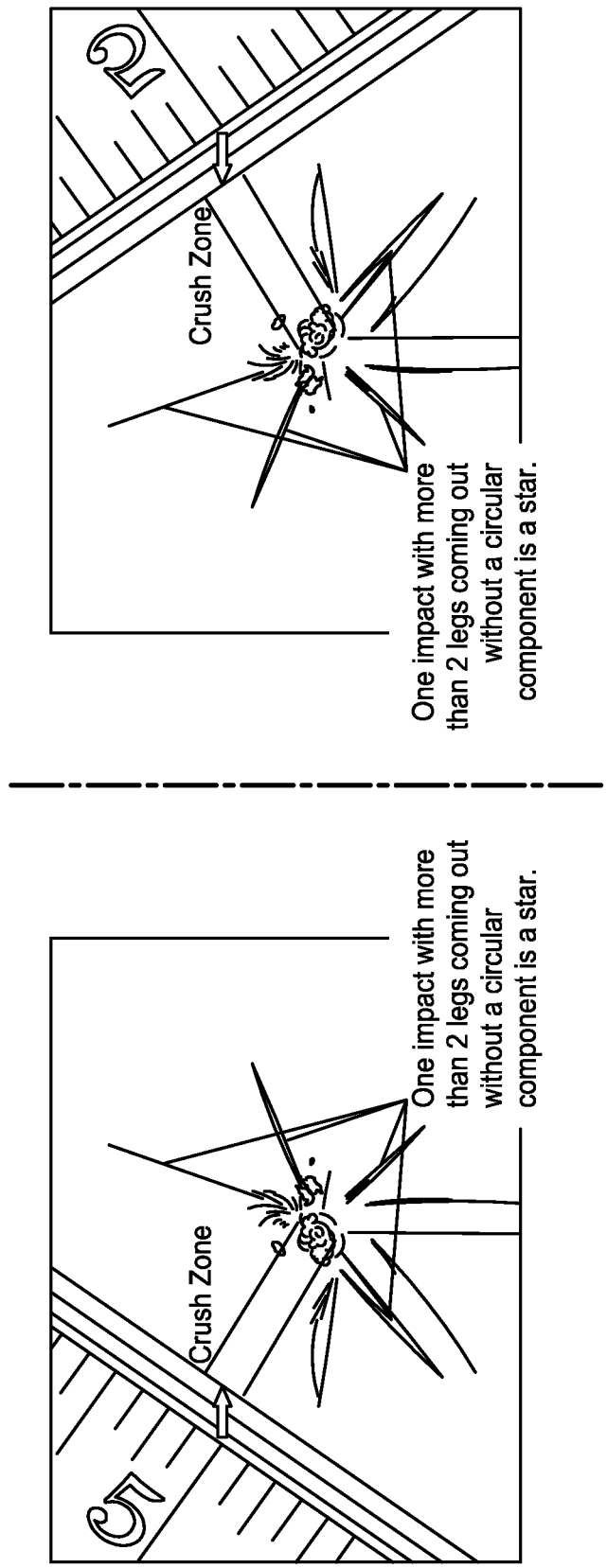
Figure 18C:
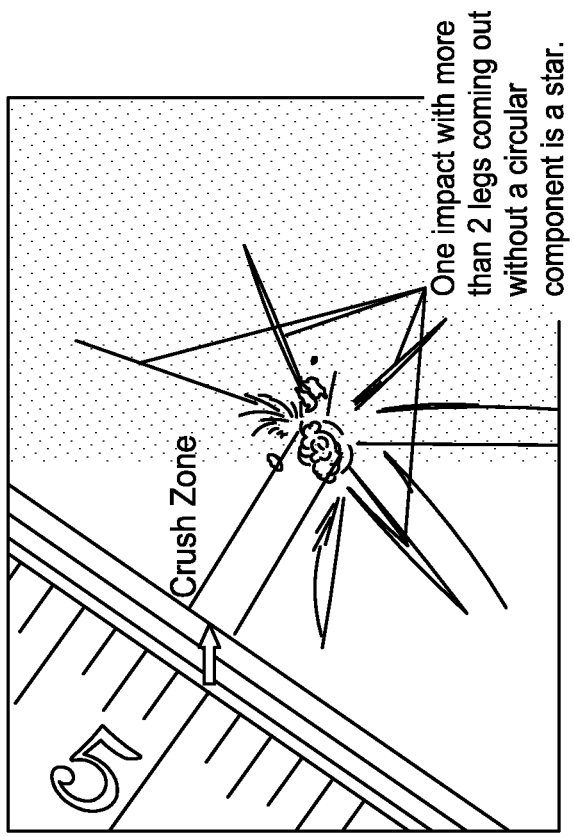
Figure 18D:
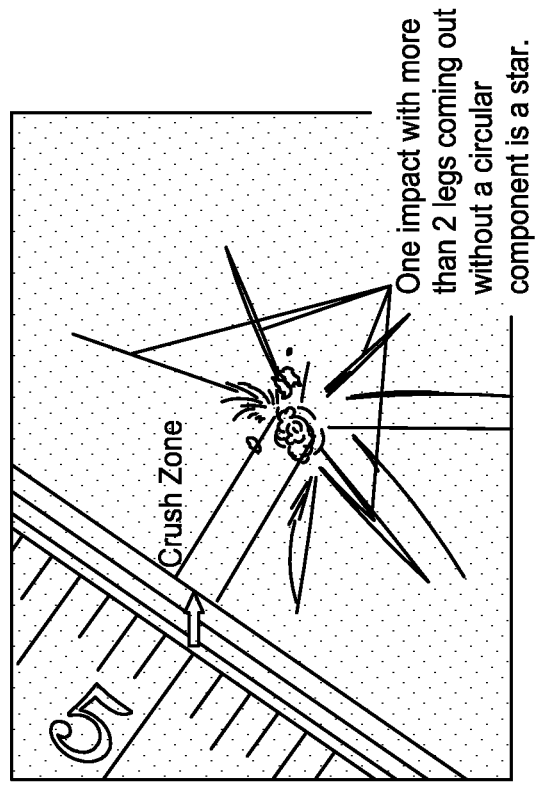
Figure 18D:
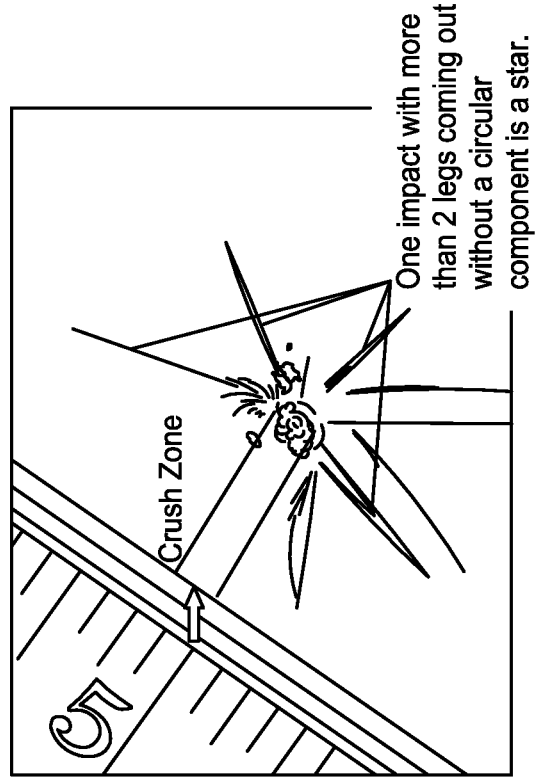

With reference to FIG. 17, portion 6 with chip 12 can have color jittering performed at 412 and/or brightness contrast changed to produce additional images at 414.

FIGS. 18A-18D show images that have been augmented such as flipped, rotated, brightness/contrast changed, or color jittered, for example. Finally, this information, along with additional information shown below in the Table 1 can be included as part of the systems and methods of the present disclosure. For example, additional details relating to the size of the chip, the location of the chip can be entered into the system and be part of the machine learning. This can provide for additional efficiency in the system and method.

TABLE 1

| Location | YES | NO |
|---|---|---|
| DPVA: (12" in width within the wiper sweep) | See DPVA Classification Step Below | See Other than DPVA Classification Step Below |
| ADAS (Rear View Mirror Area | Replace | See Other than DPVA Classification Step Below |

| DPVA (12 inches wide in wiper sweep) | | | | |
|---|---|---|---|---|
| Type | Size | Crush Zone | YES | NO |
| Bullseye chip | 1" or less in diameter | 3/16ths inch or less | Repair | Replace |
| Halfmoon chip | 1" or less in diameter | 3/16ths inch or less | Repair | Replace |
| Star chip | 1" or less in diameter | 3/16ths inch or less | Repair | Replace |
| Combo chip | 1" or less in diameter | 3/16ths inch or less | Repair | Replace |
| Batwing chip | less than 6" in diameter | 3/16ths inch or less | Repair | Replace |
| Multiple chips | Greater than 4" between chips | 3/16ths inch or less | Repair | Replace |

TABLE 1-continued

Other than DPVA: (Anywhere other than DPVA)

| Type | Size | | YES | NO |
|---|---|---|---|---|
| Bullseye chip | 1" or less in diameter | 3/8ths inch or less | Repair | Replace |
| Halfmoon chip | 1" or less in diameter | 3/8ths inch or less | Repair | Replace |
| Star chip | 3" in diameter or less | 3/8ths inch or less | Repair | Replace |
| Combo chip | 2" in diameter or less | 3/8ths inch or less | Repair | Replace |
| Batwing chip | less than 6" in diameter | 3/8ths inch or less | Repair | Replace |
| Option | Count | | YES | NO |
| Option 1 | 1 | | Repair | Replace |
| Option 2 | Less than 2 | | Repair | Replace |
| Option 3 | Less than 3 | | Repair | Replace |
| Option 4 | Less than 4 | | Repair | Replace |
| Option 5 | Less than 5 | | Repair | Replace |
| Option 6 | Less than 6 | | Repair | Replace |
| Option 7 | Less than 7 | | Repair | Replace |
| Option 8 | Less than 8 | | Repair | Replace |
| Option + | Less than + | | Repair | Replace |

Figure 19:
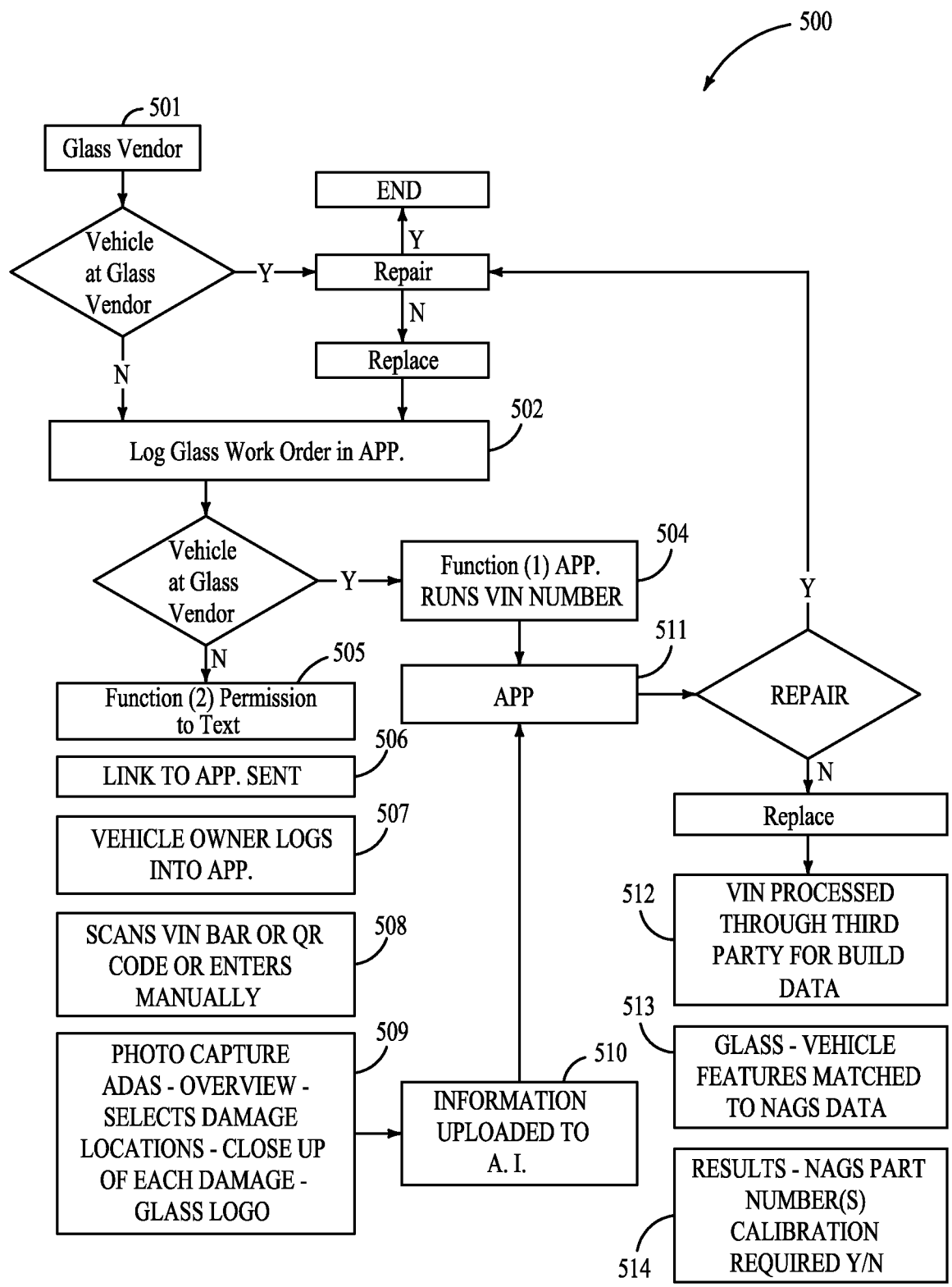
FIG. 19 is a depiction of an additional method or system that can be used in combination with the method or systems of the present disclosure according to an embodiment of the disclosure.

Referring next to FIG. 19, a third party vendors method and/or system 500 is provided that can be used alone or in combination with the methods and systems described herein is provided. At step 501 a determination of glass vendor need is made. Where the vehicle is at the glass vendor and repair rather than replacement is needed, the method or system is completed. Where the vehicle is not at the glass vendor and/or the vehicle is with the glass vendor and replacement is needed, a glass work order is logged at, for example, using the application at step 502. This application can use one or more of the processing steps of FIG. 4A, such as 40, 42, 44, and/or 45.

Upon logging a work order at 502, a determination is made regarding the glass vendor having the vehicle or not. If the glass vendor has the vehicle the system can proceed to step 504, if not the system can proceed to 505.

The method or system can allow glass vendors to utilize the AI application developed and maintained by the methods described herein via at least two separate functions 504 or 505.

Where the vehicle is at the glass vendor or glass salesperson and replacement is determined, at 511 access to the systems and/or methods of the present disclosure can be granted via an application to process the VIN (Vehicle Identification Number). After step 511, a decision of repair or replace can be determined, and the VIN may be processed at 512, match confirmed at 513, and part numbers provided at 514. Accordingly, the system or method herein at FIG. 4B at steps 54-63 can process information (VIN, for example), access glass/vehicle feature codes via third party applications, and provide accurate parts via NAGS which will give the glass vendor results including glass parts, type of glass, pricing, kits and molding requirements at 514, for example.

Alternatively, where the vehicle is not at the glass vendor or salesperson, at 505, the glass vendor can obtain permission via communication with a system monitor, such as the system or method owner or licensee. This permission can be requested at 505, via a text, call, e-mail, instant message, etc., then granted or denied. When granted, access authorization can be granted via a link or password as for example at 506. The granted user, such as Vehicle owner can log into the above system or method at step 507 and scan vehicle information such as a bar or QR code or enters VIN into the system at 508. At step 509, the user can be prompted to or provide a series of photos which are captured at 509, information is uploaded to the A.I. at 510 and then the method proceeds to the repair/replace decision. Steps 508 and 509 can utilize the processing of step 50 as well as steps 72, 74, and/or 75.

With reference to FIGS. 20-23, the methods and systems of the present disclosure can utilize alone or in combination with the other methods and conditions of the present disclosure, the following methods and conditions as described in FIGS. 20-23. In these figures, reference is made to the following definitions.

Manufacturer Build Data Provider(s) are purchased property that contain a suite of software tools on vehicle manufacturer data. It contains build sheets on OEM vehicle parts, components, rates, and exact vehicle specifications as provided by vehicle manufacturers and can be translated to identify NAGS data.

National Auto Glass Specifications. The National Auto Glass Specifications (NAGS), owned by Mitchell, define the type of itemized auto glass products that correspond to given vehicles.

Application Programming Interface. An Application Programming Interface (API) is a software translator. It allows two difference software technologies to have a common language between one another.

At present, Manufacture Build Data and NAGS uses two separate and distinct API languages. The present disclosure has discovered that when a license for Manufacture Build Data is established, developers are granted access to Manufacture Build Data API. Manufacture Build Data Providers use a RESTful API for each of its services which is compatible to standard create, read, update, and delete (CRUD) methods used in most web-based technology solutions. Manufacture Build Data Provider's underlining technology is known as JavaScript Object Notation (JSON). A NAGS licensed developer is granted access to its API which is returned in an extensible markup language known as XML. JSON uses key-value pairs to associate its various fields whereas XML uses tags (similar to HTML) to associate its fields.

Manufacture Build Data Provider's vehicle manufacturer data request requires a single parameter. This parameter is the vehicle identification number (VIN). When a request to Manufacture Build Data Provider is made using a verified (VIN), manufacture data on a vehicle is returned. Included in the response from Manufacture Build Data Provider are all the known vehicle features. Some of these features are specific to the Windshield. Examples of windshield features are "Rain Sensors" to detect precipitation and "Lane Departure Warning Signals" to detect lane departure. Each feature response comes with a feature key.

After the Manufacture Build Data Provider request is complete, a second request is made to NAGS. NAGS returns all windshields for a given vehicle year, make, model, and body style. The year, make, model, and body style is first obtained from the earlier Manufacture Build Data Provider vehicle manufacturer data response.

In accordance with example implementations, the methods and systems of the present disclosure collects, stores, and maintains a software table of vehicle features that pertain to windshields. This table contains a list of feature keys and their association to common words seen in NAGS windshields. NAGS does not contain feature keys. It only contains feature descriptions. The present systems and methods translates the XML response from NAGS into a JSON equivalent response. It then searches for feature key matches between Manufacture Build Data Provider and NAGS through its "Translation Table". The feature key of the Manufacture Build Data Provider is found in the Translation Table which contains the feature descriptions of NAGS windshields. When a match is made, the corresponding windshields for a given vehicle year, make, model, and body style are returned. This is provided in more detail in FIG. 23 and Table 1 below.

Figure 20:
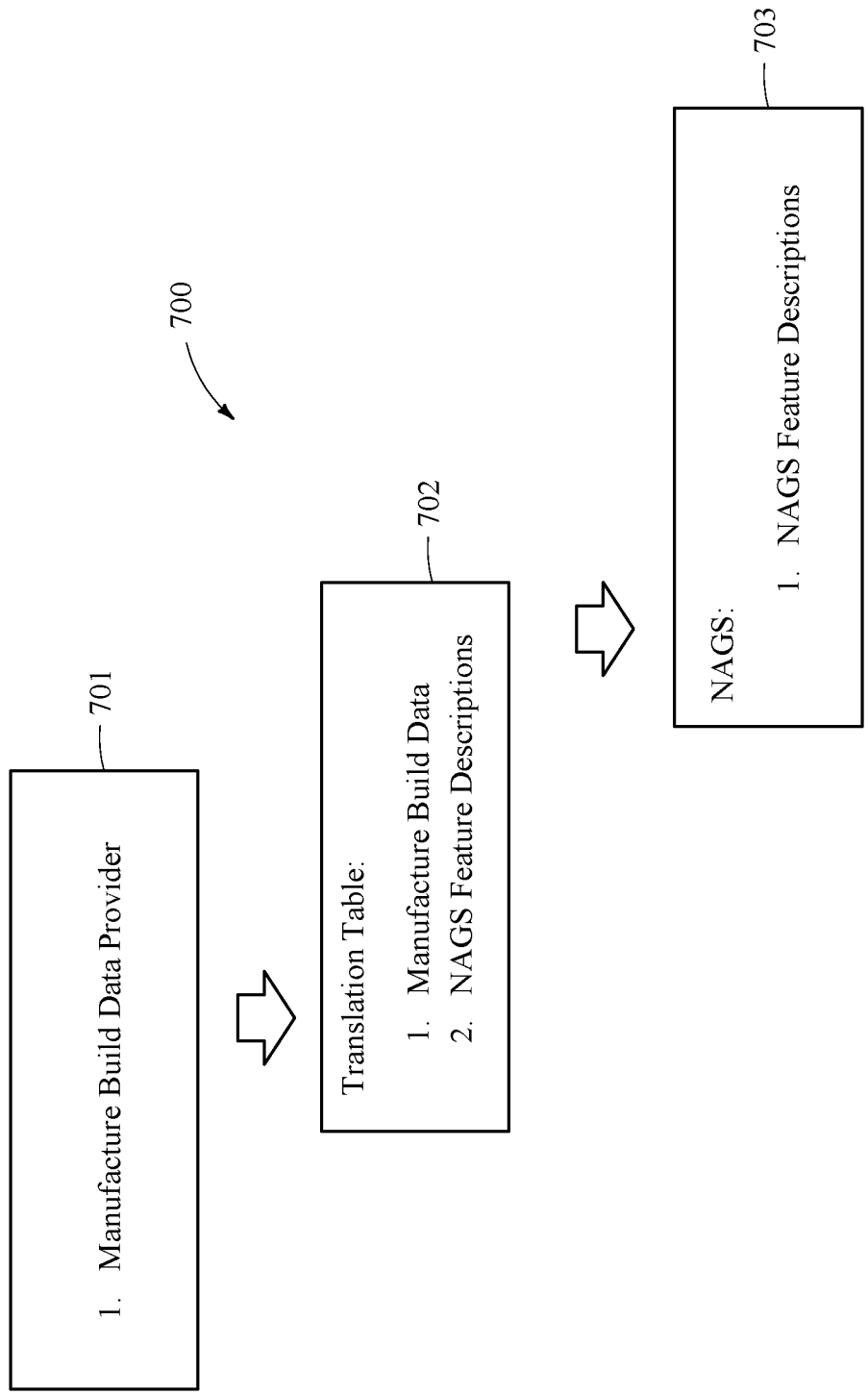
FIG. 20 is a depiction of an additional method or system that can be used in combination with the method or systems of the present disclosure according to an embodiment of the disclosure.

In accordance with one implementation as shown in FIG. 20, system 700 includes from the Manufacture Build Data Provider in 701, Manufacture Build Data Provider Feature Keys are established. The step continues to 702, wherein in the Translation Table, the Manufacture Build Data Provider Feature Keys and NAGS Feature Descriptions are provided. On to step 703, at NAGS, NAGS Feature Descriptions are provided. This is the association between the Manufacture Build Data Provider and the NAGS Feature Descriptions.

Figure 21:
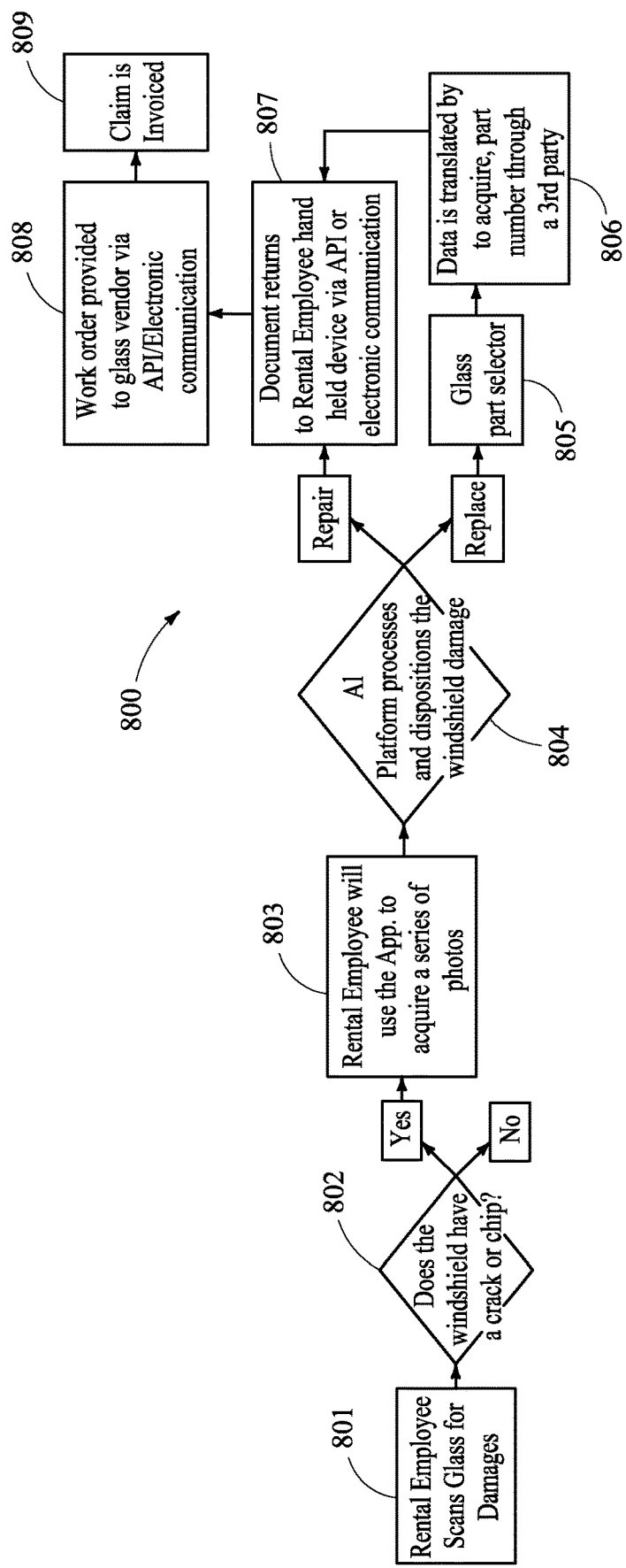
FIG. 21 is a depiction of an additional method or system that can be used in combination with the method or systems of the present disclosure according to an embodiment of the disclosure.

In accordance with at least one example implementation, referring to FIG. 21, system 800 is provided that gives an example of a rental car use case. In step 801, a rental car staff member, for example, can scan glass to locate any chips or cracks. The system proceeds to step 802, which is to determine whether or not there is a chip or crack present. If a chip or crack is located, the agent uses processing circuitry to acquire photos of all damages in 803. The images can then be scanned in step 804 via the AI platform, and disposition of the damage is determined as repair or replace. If replacement is determined, then in step 805 the build sheet data is obtained, and in 806 the data is translated by the translation table, and part data is obtained through a third party. In 808, a replacement dispatch is sent to the glass replacement vendor. If repair only work is done, the system proceeds to 807 to return documentation to the rental staff member's hand held device via API or electronic communication, and the system returns to 808 as described, and then finally, the claim is invoiced in step 809.

Figure 22:
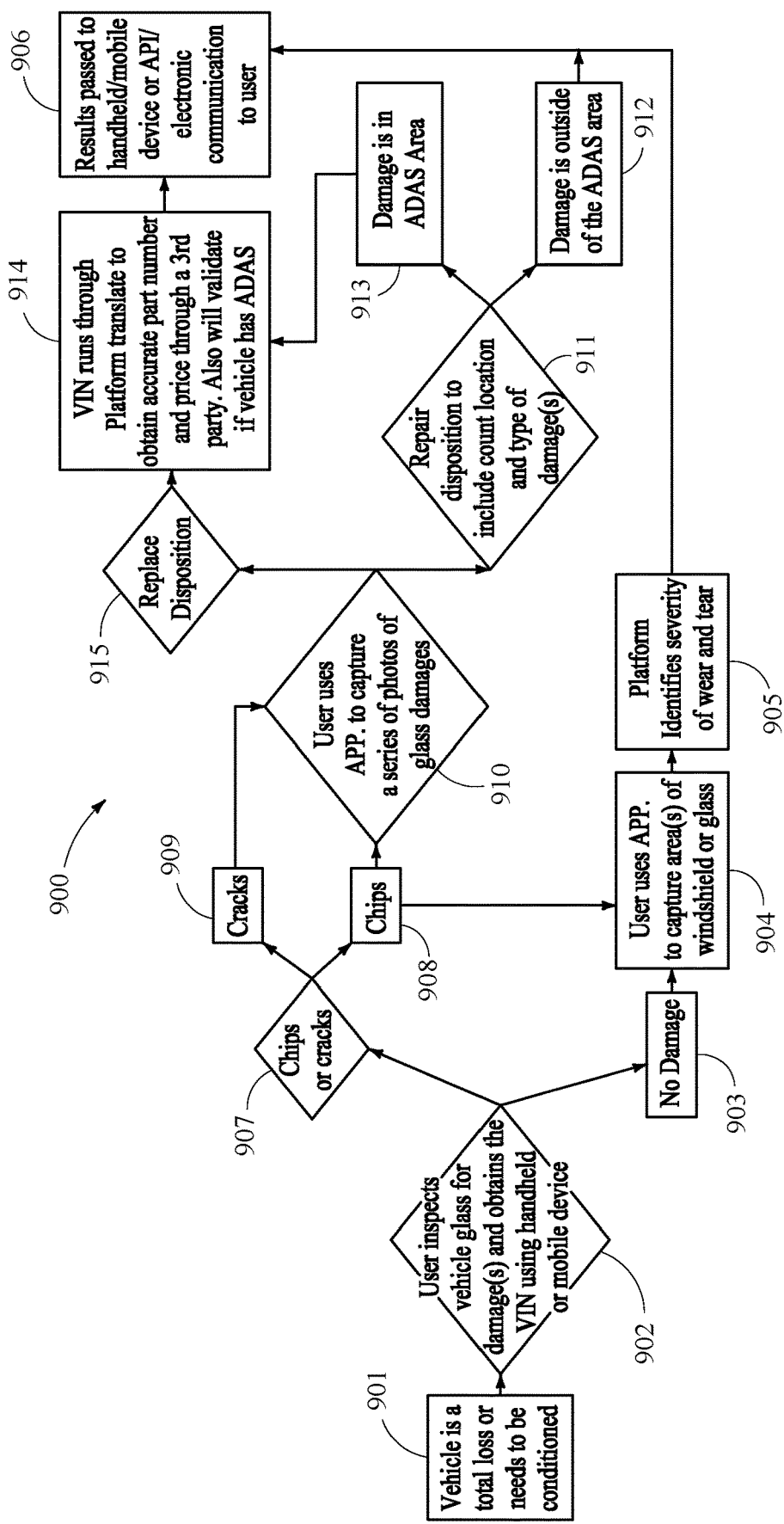
FIG. 22 is a depiction of an additional method or system that can be used in combination with the method or systems of the present disclosure according to an embodiment of the disclosure.

Referring next to FIG. 22, system 900 is provided as an example for total loss or vehicle glass conditioning. In step 901, a vehicle is determined a total loss or needs to be conditioned. In step 902, the vehicle is inspected by a third party salvage vendor, insurance carrier representative, or repair facility, and then the user will identify if there are any chips or cracks in the glass at 907. If there is damage, photos will be taken of the area damaged at 910. If no damage, at 903 a series of photos are taken to indicate if there is a pit in the windshield, and if so, the severity. Refer to FIG. 11G regarding pits. The method and system will determine the number of pits in a defined area in each photo, and determine level of wear and tear at steps 904 and 905. The damage will be uploaded using handheld device into the system or method at 906. The methods or system will determine the number of chips present at 911, or if the glass is cracked. The system will report the number of repairable chips back to the client and then report back to the client indicating for glass replacement at 915, and if glass replacement is required, build sheet data will be provided at 914 and obtained through a third party at 906. That data received is translated into the translation table described, and part data and pricing is obtained thorough a third party not shown in the system. The replacement cost is sent to the insurance client at 906 and the claim is billed at 906.

Figure 23:
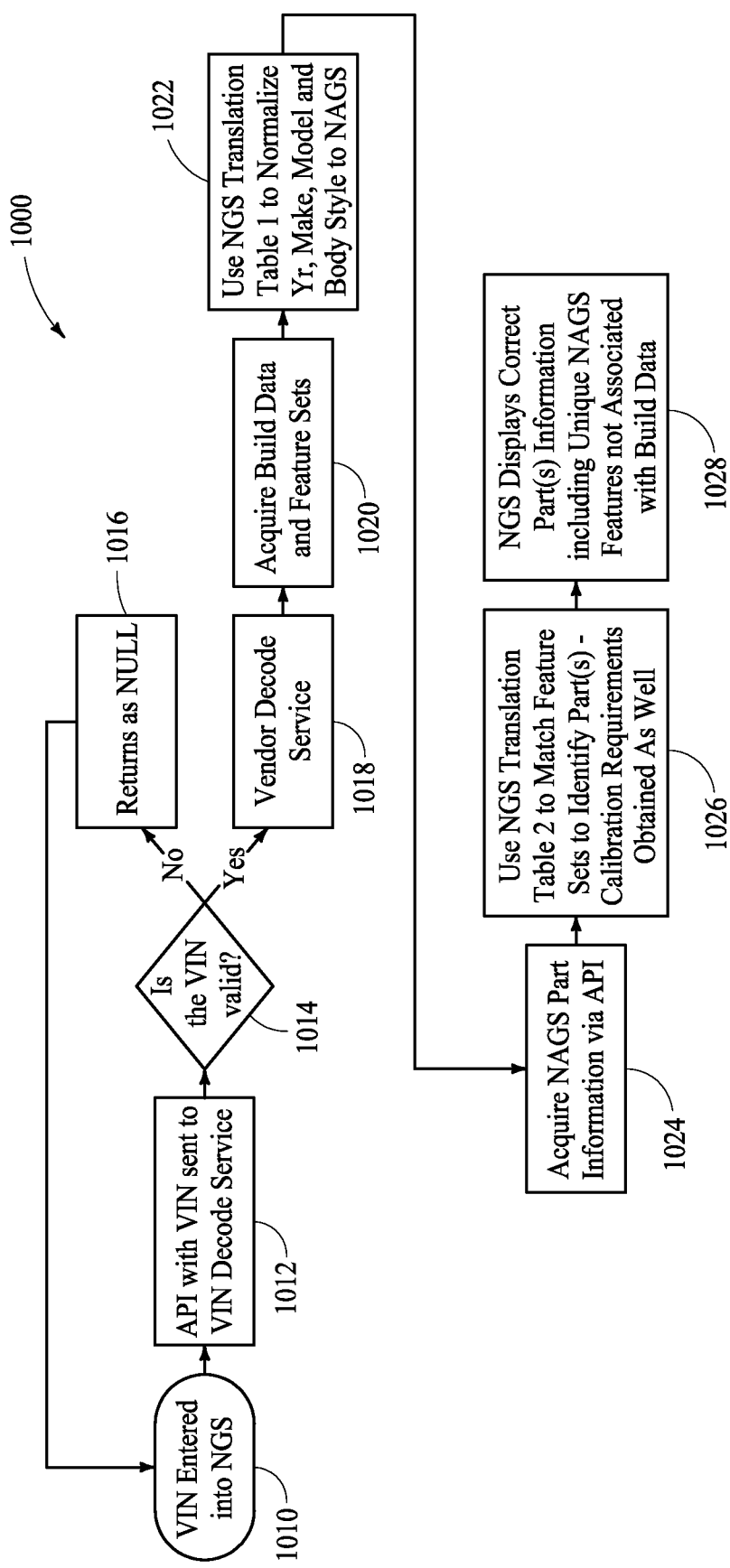
FIG. 23 is a depiction of an additional method or system that can be used in combination with the method or systems of the present disclosure according to an embodiment of the disclosure.

Referring to FIG. 23 and with reference to FIGS. 19-22 and the below Table, a VIN # can be entered into NGS at 1010. At 1012, the API with VIN # can be provided to a decode service. Decode services are vendors that are provided a vehicle VIN # and returns at least one or more of the year, make, model, edition, body style, etc. of the vehicle. A determination of VIN # validity can be made at 1014, and if NULL, the method returns to 1010 to request or await a new VIN #. If valid, at 1018, a Vendor Decode service is used. Then, at 1020 Build Data and Feature Sets are acquired using information received from the decode service. Using Table 2 below, at 1022, NGS is translated to normalize Yr, Make, Model, and Body Style to NAGS as shown with one example below.

TABLE 2

| TP Build Data Provider | | | | | | NAGS Features | | | | |
|---|---|---|---|---|---|---|---|---|---|---|
| ID | ID 2 | Equipment Category | Feature Name | Equipment Value | ID | ID 2 | NAGSID | ID | ID 2 | Feature Name | Calibration |
| 211 | 444 | | Heated Wiper Rest | 4 | 444 | 9 | 17 | 9 | Heated Wiper Park | |

At 1024, NAGS part information is acquired via API. At 1026 NGS translation table 3 below is used to match Feature sets to Identify part(s). Calibration requirements can be obtained as well. Then at 1028 NGS displays Correct Part(s) information including Unique NAGS Features not Associated with Build Data.

TABLE 3

| styleid | country | year | manufacturer | division | series | model | Marketing trim | trim_2 | Trim variation |
|---|---|---|---|---|---|---|---|---|---|
| 300466 | US | 2009 | Honda | Acura | TSX | TSX | Base | | 4dr Sdn Man |
| 300467 | US | 2009 | Honda | Acura | TSX | TSX | Base | | 4dr Sdn Auto |
| 300468 | US | 2009 | Honda | Acura | TSX | TSX | Base | Tech Pkg | 4dr Sdn Man Tech Pkg |

TABLE 3-continued

| | | | | | | | | | |
|---|---|---|---|---|---|---|---|---|---|
| 300469 | US | 2009 | Honda | Acura | TSX | TSX | Base | Tech Pkg | 4dr Sdn Auto Tech Pkg |
| 302602 | US | 2009 | Honda | Acura | RL | RL | 3.7 | | 4dr Sdn (Natl) |
| 302603 | US | 2009 | Honda | Acura | RL | RL | 3.7 | | 4dr Sdn (HI) |
| 302604 | US | 2009 | Honda | Acura | RL | RL | 3.7 | Tech Pkg | 4dr Sdn Tech Pkg (Natl) |
| 302605 | US | 2009 | Honda | Acura | RL | RL | 3.7 | Tech/ CMBS w/ PAX | 4dr Sdn Tech/ CMBS w/PAX (Natl) |
| 305590 | US | 2009 | Honda | Acura | RDX | RDX | Base | | AWD 4dr |
| 305591 | US | 2009 | Honda | Acura | RDX | RDX | Base | Tech Pkg | AWD 4dr Tech Pkg |
| 306981 | US | 2009 | Honda | Acura | MDX | MDX | Base | | AWD 4dr |

| styleid | Body variation | Body style | Vehicle type | mfg carcode | friendly_model | NAGS Make | NAGS Model | NAGS Body Style |
|---|---|---|---|---|---|---|---|---|
| 300466 | 4dr Sdn Man | Sedan | Car | CU2569JW | Manual | Acura | TSX | 4 Door Sedan |
| 300467 | 4dr Sdn Auto | Sedan | Car | CU2669JW | Automatic | Acura | TSX | 4 Door Sedan |
| 300468 | 4dr Sdn Man | Sedan | Car | CU2569KW | Manual with Technology Package | Acura | TSX | 4 Door Sedan |
| 300469 | 4dr Sdn Auto | Sedan | Car | CU2669KW | Automatic with Technology Package | Acura | TSX | 4 Door Sedan |
| 302602 | 4dr Sdn (Natl) | Sedan | Car | KB2659KW | Automatic | Acura | RL | 4 Door Sedan |
| 302603 | 4dr Sdn (HI) | Sedan | Car | KB2639KW | Automatic (Hawaii) | Acura | RL | 4 Door Sedan |
| 302604 | 4dr Sdn (Natl) | Sedan | Car | KB2669KW | Automatic with Technology Package | Acura | RL | 4 Door Sedan |
| 302605 | 4dr Sdn (Natl) | Sedan | Car | KB2669KXW | Automatic with Technology and CMBS/ PAX Packages | Acura | RL | 4 Door Sedan |
| 305590 | AWD 4dr | Sport Utility | Sport Utility | TB1829JNW | AWD | Acura | RDX | 4 Door Utility |
| 305591 | AWD 4dr | Sport Utility | Sport Utility | TB1859KNW | AWD with Technology Package | Acura | RDX | 4 Door Utility |
| 306981 | 4WD 4dr | Sport Utility | Sport Utility | YD2829JNW | AWD | Acura | MDX | 4 Door Utility |

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A non-transitory computer-readable storage medium storing instruction that, when executed by a processor, causes a computer system to perform the following method:
   prompt a user for initial claim submission information;
   prompt a user for a plurality of images of portions of motor vehicle glass;
   perform image processing operations on each of the plurality of images to determine one or more of glass damage, glass type, and/or claim fraud, wherein the image processing operations include:
   prompting the use for the VIN number of the vehicle;
   prompting for photos of the vehicle, vehicle glass, and damaged portions;
   accessing data of the photos of the vehicle, vehicle glass, and damaged portions from the user;
   using the processor, processing the data of the photos of the vehicle, vehicle glass, and damaged portions to determine repair or replace, wherein the processing includes:
   classifying the damaged portions;
   augmenting the data of the photos;
   fitting the data of the photos to a model; and
   comparing the data of the photos to a truth table;
   if replace, the VIN number is processed through third party data to determine the required part numbers; and if repair, a work order is generated; and
submit insurance claim for motor vehicle glass repair or replace.

2. The computer readable storage medium of claim 1 wherein the method further comprises comparing information from the plurality of images to initial claim submission information.

3. The computer readable storage medium of claim 1 wherein the method further comprises comparing information from the plurality of images to third party information.

4. The computer readable storage medium of claim 1 wherein the method further comprises comparing information from the plurality of images to trained system information.

5. The computer readable storage medium of claim 1 wherein the machine learning and/or training comprises augmenting the images received.

* * * * *